(12) United States Patent
Yu

(10) Patent No.: US 11,900,098 B2
(45) Date of Patent: Feb. 13, 2024

(54) MICRO-SERVICE MANAGEMENT SYSTEM AND DEPLOYMENT METHOD, AND RELATED DEVICE

(71) Applicant: Tencent Technology (Shenzhen) Company Limited, Guangdong (CN)

(72) Inventor: Yifan Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 77 days.

(21) Appl. No.: 17/721,416

(22) Filed: Apr. 15, 2022

(65) Prior Publication Data

US 2022/0236978 A1    Jul. 28, 2022

Related U.S. Application Data

(63) Continuation of application No. PCT/CN2021/078026, filed on Feb. 26, 2021.

(30) Foreign Application Priority Data

Apr. 22, 2020 (CN) .......................... 202010322014.0

(51) Int. Cl.
G06F 8/65 (2018.01)
(52) U.S. Cl.
CPC ..................... *G06F 8/65* (2013.01)
(58) Field of Classification Search
None
See application file for complete search history.

(56) References Cited

U.S. PATENT DOCUMENTS 10,013,550 B1 *  7/2018  Ahuja .................... G06F 21/56
11,032,164 B1 *  6/2021  Rothschild ............. H04L 41/40
(Continued)

FOREIGN PATENT DOCUMENTS

| CN | 109218355 A | 1/2019 |
|----|-------------|--------|
| CN | 109254859 A | 1/2019 |

(Continued)

OTHER PUBLICATIONS

International Search Report for PCT/CN2021/078026 dated May 28, 2021 (PCT/ISA/210).

(Continued)

*Primary Examiner* — Ryan D. Coyer
(74) *Attorney, Agent, or Firm* — Sughrue Mion, PLLC

(57) ABSTRACT

Embodiments of the present disclosure may provide a microservice management system, device, and apparatus. The system may include a microservice deployment device, a plurality of computing resource pools, and a target service chain. The target service chain may include at least one target microservice entity device, which may be from at lone of the plurality of computing resource pools. The microservice deployment device may be configured to obtain service processing information of the target service chain, generate a deployment update configuration information according to the service processing information of the target service chain, and adjust a deployment position of each of the at least one target microservice entity device on the target service chain according to the deployment update configuration information.

20 Claims, 11 Drawing Sheets

(56) References Cited

U.S. PATENT DOCUMENTS

| | | | |
|---|---|---|---|
| 11,074,091 B1* | 7/2021 | Nayakbomman | G06F 9/455 |
| 2016/0094384 A1* | 3/2016 | Jain | H04L 67/14 |
| | | | 709/221 |
| 2018/0307524 A1 | 10/2018 | Vyas et al. | |
| 2020/0137151 A1* | 4/2020 | Chi | H04L 67/563 |
| 2021/0058455 A1* | 2/2021 | Kozhaya | H04L 47/805 |

FOREIGN PATENT DOCUMENTS

| | | |
|---|---|---|
| CN | 110740194 A | 1/2020 |
| CN | 111522661 A | 8/2020 |

OTHER PUBLICATIONS

Written Opinion for PCT/CN2021/078026 dated May 28, 2021 (PCT/ISA/237).

* cited by examiner

_MICRO-SERVICE MANAGEMENT SYSTEM AND DEPLOYMENT METHOD, AND RELATED DEVICE_

CROSS-REFERENCE TO RELATED APPLICATION(S)

This application is a continuation application of International Application No. PCT/CN2021/078026, filed Feb. 26, 2021, which claims priority to Chinese Patent Application No. 202010322014.0, filed with the China National Intellectual Property Administration on Apr. 22, 2020, the disclosures of which are incorporated herein by reference in their entireties.

FIELD

The present disclosure relates to the field of Internet technologies and the field of computer technologies, and in particular, to a microservice (or micro-service) management technology and a microservice deployment technology.

BACKGROUND

For conventional software systems, all functions are generally put into a single process, and this architecture is referred to as a monolithic architecture. The monolithic architecture works well in a case that a system scale is relatively small, but as the system scale expands, the monolithic architecture exposes increasingly more problems, which mainly include: low development efficiency, difficult system maintenance, difficulty in modifying software functions due to functional coupling, a slow deployment speed, poor stability, difficulty in scaling as required, and the like. To resolve the above-mentioned problems of the monolithic architecture, a microservice (or micro-service) architecture may be used. The core idea of the microservice architecture is to disassemble a single program as finely as possible, and use a plurality of microservices to develop a single application. Each microservice runs in a respective process, and these microservices are constructed based on service capabilities, and may be independently deployed through an automatic deployment mechanism. This may be implemented in different programming languages, different data storage technologies are used, and a lowest level of minimal centralized management is maintained. In a system using the microservice architecture (hereinafter referred to as a microservice management system), how to deploy each microservice directly affects a global service response time.

Currently, the microservice management system includes a microservice application center and a microservice task center that are mainly oriented to a centralized cloud computing environment. However, when the microservice application center and the microservice task center adjust a deployment manner for a microservice, the global service response time rarely optimizes. Therefore, deploying each microservice in the microservice architecture to reduce the global service response time becomes a problem to be resolved urgently.

SUMMARY

Embodiments of the present disclosure provide a microservice (or micro-service) management system, a microservice deployment method, and a related device, to adaptively and flexibly adjust deployment of a target microservice entity device with reference to a load status of each target microservice entity device on a target service chain and a transmission delay between the target microservice entity devices.

According to an aspect of the present disclosure a microservice management system may be provided. The microservice management system may include: a microservice deployment device and a plurality of computing resource pools; and the microservice management system may include a target service chain, the target service chain includes at least one target microservice entity device, and the at least one target microservice entity device is from at least one of the computing resource pools, wherein the microservice deployment device is configured to: obtain service processing information of the target service chain, generate deployment update configuration information according to the service processing information of the target service chain, and adjust a deployment position of each of the at least one target microservice entity device on the target service chain according to the deployment update configuration information; wherein the service processing information includes at least a service response time, and the service response time is determined based on load information of each of the at least one target microservice entity device on the target service chain and a transmission delay between the target microservice entity devices; and wherein the deployment update configuration information includes adjustment information for the deployment position of each of the at least one target microservice entity device on the target service chain.

According to an aspect of the present disclosure a microservice deployment method may be provided. The method may be performed by a microservice deployment device in a microservice management system, the microservice management system includes a plurality of computing resource pools and a target service chain; the target service chain includes at least one target microservice entity device, and the at least one target microservice entity device being from at least one of the computing resource pools; and the method includes:

obtaining service processing information of the target service chain, the service processing information including at least a service response time, the service response time being determined based on a load information of each of the at least one target microservice entity device on the target service chain and a transmission delay between target microservice entity devices;

generating deployment update configuration information according to the service processing information of the target service chain, the deployment update configuration information including adjustment information for a deployment position of each of the at least one target microservice entity device on the target service chain; and adjusting the deployment position of each of the at least one target microservice entity device on the target service chain according to the deployment update configuration information.

According to an aspect, the embodiments of the present disclosure provide a microservice deployment apparatus, configured in a microservice deployment device in a microservice management system, the microservice management system includes a plurality of computing resource pools and a target service chain; the target service chain includes at least one target microservice entity device, and the at least one target microservice entity device being from at least one of the plurality of computing resource pools; and the deployment apparatus including at least one processor to implement:
  an obtaining unit, configured to obtain service processing information of the target service chain, the service processing information including at least a service response time, the service response time being determined based on load information of each of the at least one target microservice entity device on the target service chain and a transmission delay between target microservice entity devices;
  a processing unit, configured to generate deployment update configuration information according to the service processing information of the target service chain, the deployment update configuration information including adjustment information for a deployment position of each of the at least one target microservice entity device on the target service chain; and
  an adjustment unit, configured to adjust the deployment position of each of the at least one target microservice entity device on the target service chain according to the deployment update configuration information.

According to an aspect, the embodiments of the present disclosure further provide a microservice deployment device, applicable to a microservice management system, where the microservice management system includes a plurality of computing resource pools and a target service chain; and the target service chain includes at least one target microservice entity device, and the at least one target microservice entity device being from at least one of the computing resource pools; and
  the microservice deployment device includes a processor and a storage apparatus, the storage apparatus is configured to store program instructions, and the processor invokes the program instructions to perform the following:
  obtaining service processing information of the target service chain, the service processing information including at least a service response time, the service response time being determined based on load information of each of the at least one target microservice entity device on the target service chain and a transmission delay between target microservice entity devices;
  generating deployment update configuration information according to the service processing information of the target service chain, the deployment update configuration information including adjustment information for a deployment position of each of the at least one target microservice entity device on the target service chain; and
  adjusting the deployment position of each of the at least one target microservice entity device on the target service chain according to the deployment update configuration information.

According to an aspect, the embodiments of the present disclosure further provide a computer storage medium, storing program instructions, the program instructions, when executed, being configured to implement the above-mentioned methods.

According to an aspect, the embodiments of the present disclosure further provide a computer program product, including instructions, the instructions, when run on a computer, causing the computer to perform the above-mentioned methods.

In an embodiment of the present disclosure, the microservice deployment device may determine service processing information of a target service chain based on load information of each target microservice entity device on the target service chain and a transmission delay between the target microservice entity devices, generate deployment update configuration information according to the service processing information of the target service chain, and adjust a deployment position of each target microservice entity device on the target service chain according to the deployment update configuration information. In the process of adjusting the deployment position of each target microservice entity device, the deployment of the target microservice entity device is adaptively and flexibly adjusted with reference to a load status of each target microservice entity device and the transmission delay between the target microservice entity devices, to effectively reduce the service response time of the target service chain after deployment adjustment.

BRIEF DESCRIPTION OF THE DRAWINGS

To describe the technical solutions of embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DETAILED DESCRIPTION

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1A:
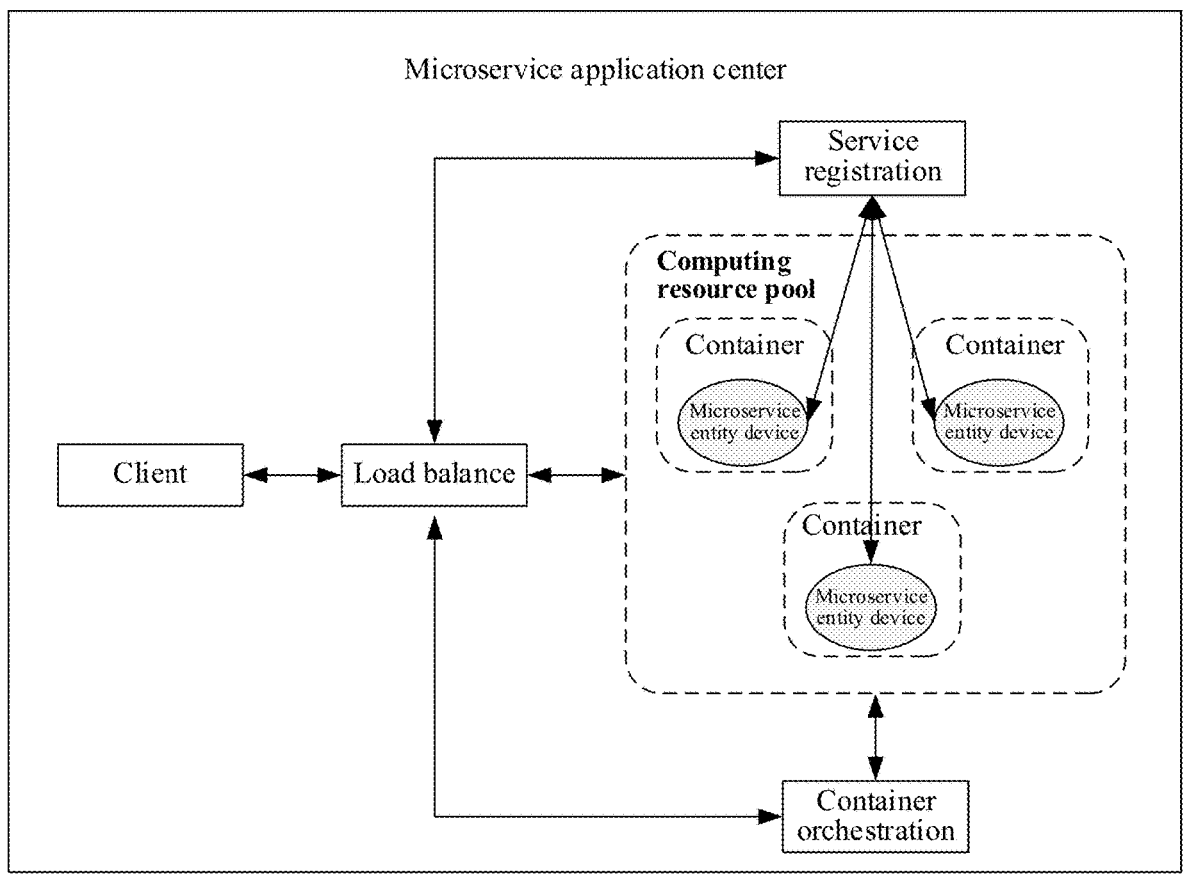
FIG. 1a is a schematic structural diagram of a microservice (or micro-service) application center in the related technology.

Currently, microservice (or micro-service) management system includes a microservice application center and a microservice task center that are mainly oriented to a centralized cloud computing environment. FIG. 1a is a schematic structural diagram of a microservice application center. The microservice application center processes a client request by dynamically creating a microservice entity device. The microservice application center may be implemented based on a synchronous request/response model. The microservice entity device provides, based on a Hypertext Transfer Protocol (HTTP), an application programming interface (API) that may be directly called for a client. The microservice application center generally uses a container to implement distributed running of the microservice entity devices. Each microservice entity device runs in a container environment, and needs to be registered in a service registration entity, indicating a specific network position (an Internet Protocol (IP) address and a port) of a service process. The microservice entity device may be understood as a service process independently deployed in each container, and each service process is configured to provide a service. A cloud game may be used as an example. The service may be a screen rendering service, a game user permission authentication service, or the like. An Internet of Vehicles (IoV) may be used as an example. The service may be a road information acquisition service, a user permission authentication service of the IoV, or the like.

Cloud gaming is also referred to as gaming on demand, and is an online gaming technology based on cloud computing technologies. The cloud gaming technology enables a terminal device with relatively limited graphics processing capabilities and data computing capabilities may run a high-quality game. In a cloud gaming scene, a game may not be run on a player's game terminal, but may instead be run on a cloud server, and the cloud server may render a game scene into a video and audio stream, and may transmit the video and audio stream to the player's game terminal through a network. The player's game terminal may not need to have powerful graphics operation and data processing capabilities, but only have a basic streaming media playback capability and a capability of obtaining a player input instruction and transmitting the player input instruction to the cloud server. In an embodiment of the present disclosure, the server configured to run the microservice entity device is the cloud server.

The microservice application center needs to be continuously run in a computing resource pool, and dynamically increases or decreases the microservice entity devices according to a traffic status requested by the client according to a traffic condition requested by the client and by using a container orchestration tool. To implement a dynamic operation on the microservice entity device, the microservice application center needs to deploy a load balancer at a front end of the system. When a client request reaches, the load balancer first reads the request, and directly routes the request to an available microservice entity device according to registration information in the service registration entity and a principle of load sharing of each microservice entity device. The load balancer tracks a response status of each called microservice entity device in real time, and if finding that a request does not have a response, distributes the request to another available microservice entity device. In addition, the load balancer may further interact with a container orchestrator, to obtain real-time monitoring data of a container process, remove an overloaded microservice entity device from a scheduling list in advance by using a specific warning method, and apply to add a new container to the container orchestrator to run a new microservice entity device.

Figure 1B:
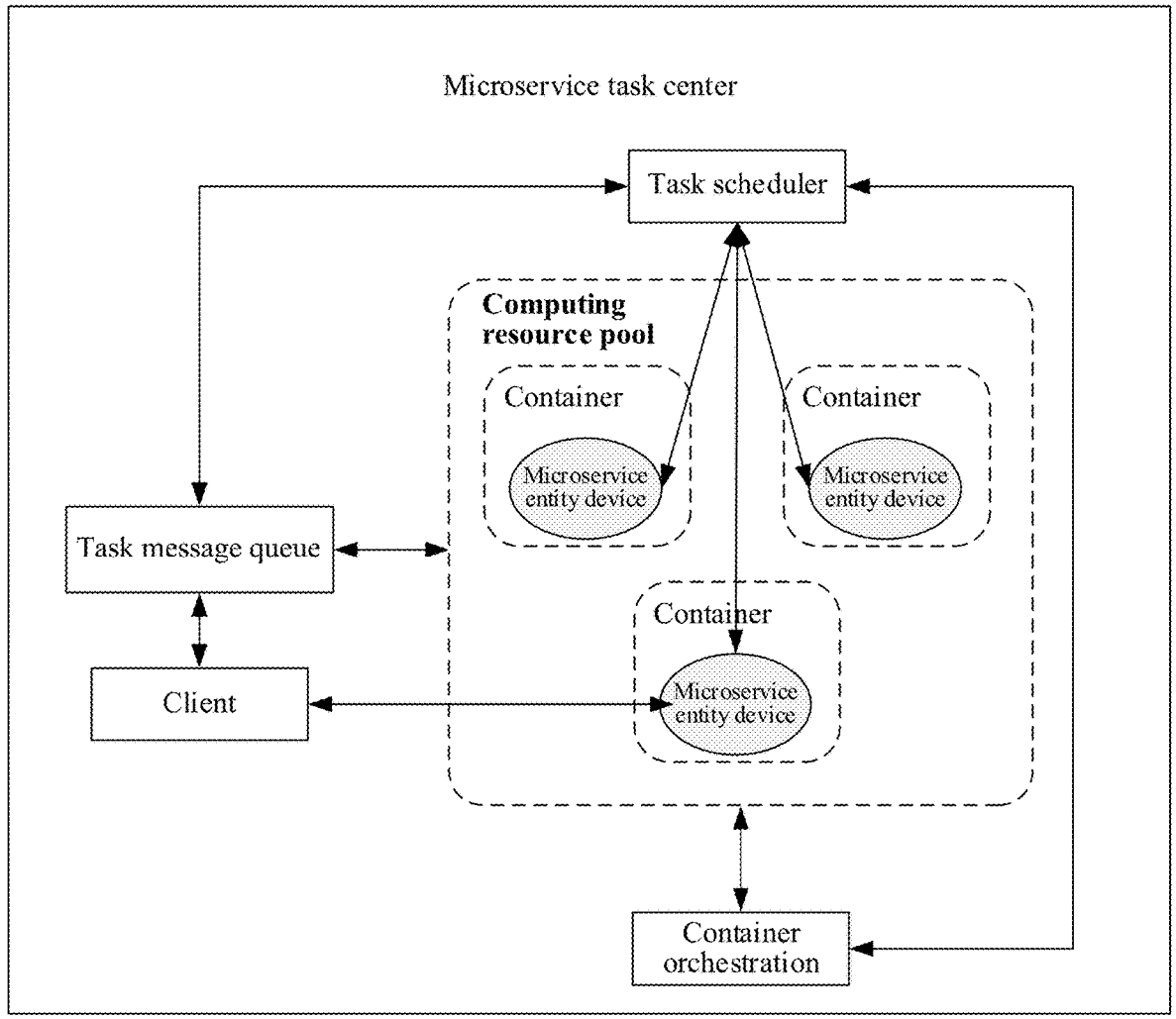
FIG. 1b is a schematic structural diagram of a microservice task center in the related technology.

FIG. 1b is a schematic structural diagram of a microservice task center. The microservice task center controls the microservice entity device to perform a task in a manner of starting as required and in the form of event triggering. Each microservice entity device relies on a minimal base image layer in the container for fast startup. The microservice task center is implemented according to an event-driven model, and performs asynchronous workflow processing by relying on a task message queue. The client request is stored in the task message queue as a task event, and the microservice entity device obtains and processes the client request by reading the task message queue. The client request is stored in the task message queue until the client request is processed.

The microservice task center performs a task according to a priority of the client request. That is, a task scheduler in the task message queue dynamically assigns a task to the microservice entity device according to a load status of each microservice entity device and the priority of the client request. After being started, each microservice entity device needs to perform service registration with the task scheduler and reports a workload status of the microservice entity device in real time.

The microservice task center uses the container orchestrator to uniformly manage container resources in the computing resource pool. The task scheduler dynamically changes a quantity of containers by interacting with the container orchestrator, to support capacity expansion or capacity compression of the microservice entity device. In addition, the container orchestrator may notify the task scheduler of a resource consumption status of each container, so that the task scheduler may remove an overloaded microservice entity device from a task scheduling list in advance, and add a new microservice entity.

In practice, when the microservice application center and the microservice task center currently adjust deployment of the microservice entity device, a global response time often fails to be optimized for a service system formed by a service chain. Especially under the current service development trend of cloud-edge collaboration (that is, collaboration between an edge cloud environment and a central cloud environment), a plurality of microservice entity devices in a complete service system may be distributed in a plurality of positions such as an edge cloud environment and a central cloud environment, and a global service response is not only related to a load status of the microservice entity device, but also is related to a network delay between the microservice entity devices. However, it is difficult for both the microservice application center and the microservice task center to be applicable to this new service system form.

Figure 1C:
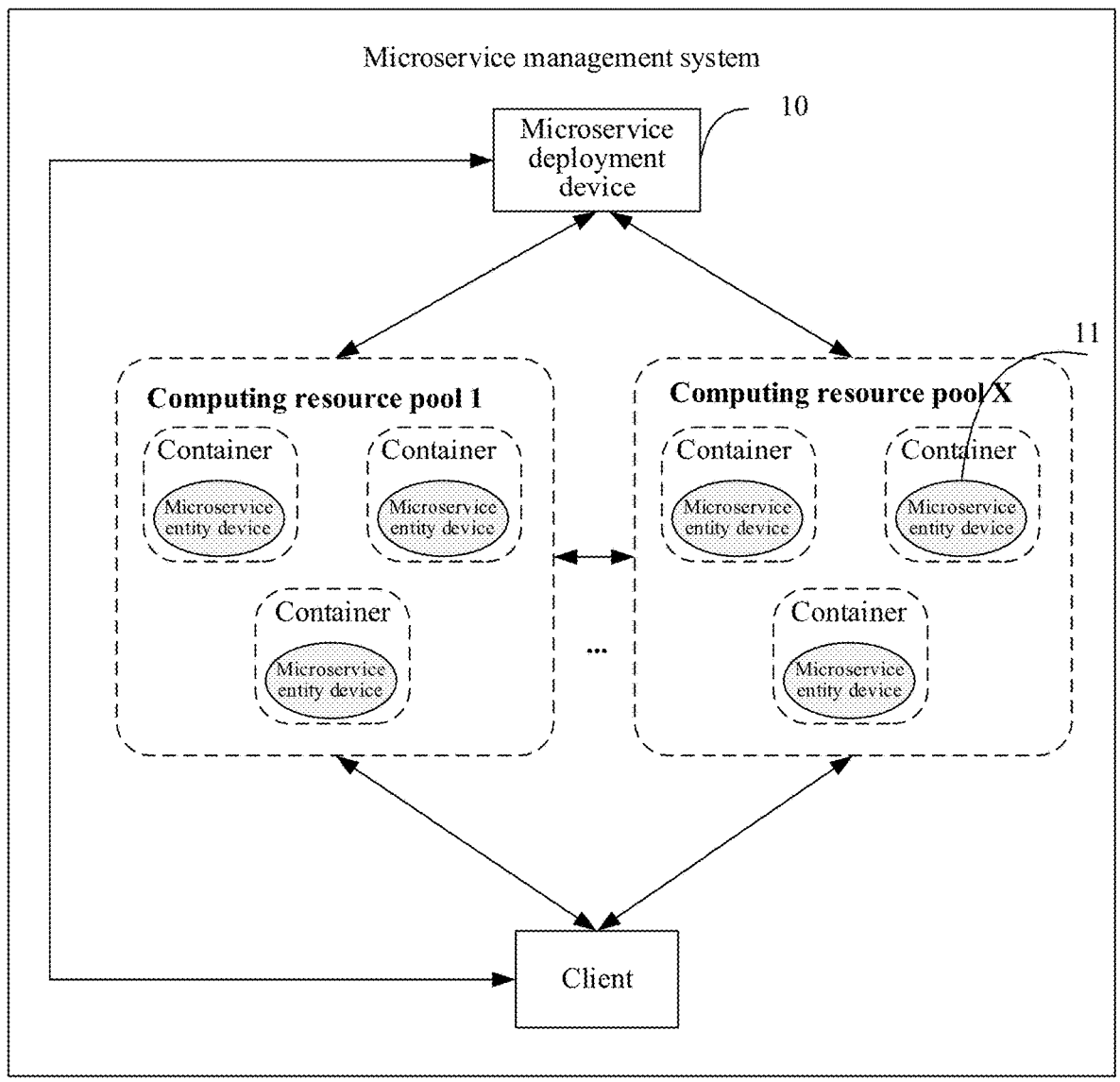
FIG. 1c is a schematic structural diagram of a microservice management system according to an embodiment of the present disclosure.

The embodiments of the present disclosure provide a microservice management system. Referring to FIG. 1c, the microservice management system includes a microservice deployment device 10 and a plurality of computing resource pools, a microservice entity device 11 is deployed in each computing resource pool, the microservice management system includes a running target service chain, and the target service chain includes at least one target microservice entity device. The at least one target microservice entity device is from at least one computing resource pool, and the computing resource pool provides a service processing environment for the microservice entity device, and may be formed by edge data center nodes scattered at a network edge, or may be formed by a centralized data center in a central cloud environment. Different computing resource pools are connected to each other through a network. In other words, the computing resource pool may include at least one of a central computing resource pool and an edge computing resource pool, the central computing resource pool is disposed in a central cloud environment, and the edge computing resource pool is disposed in an edge cloud environment.

The microservice deployment device 10 may be a server. The server may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The client in FIG. 1c may be a terminal device such as a smartphone, a tablet computer, a notebook computer, a desktop computer, a smart speaker, or a smartwatch, or may be an application (such as a game application or an IoV application) run in a terminal device or a network platform, but is not limited thereto. The client and the server may be directly or indirectly connected in a wired or wireless communication manner. This is not limited in the present disclosure.

The microservice deployment device 10 may be configured to: obtain service processing information of the target service chain, generate deployment update configuration information according to the service processing information of the target service chain, and adjust a deployment position of each target microservice entity device on the target service chain according to the deployment update configuration information; the service processing information includes at least a service response time, and the service response time is determined based on load information of each target microservice entity device on the target service chain and a transmission delay between the target microservice entity devices; and the deployment update configuration information includes adjustment information for a deployment position of each target microservice entity device on the target service chain. It can be learned that in the process of adjusting the deployment position of each target microservice entity device on the target service chain, the microservice management system provided in the embodiments of the present disclosure may adaptively and flexibly adjust the deployment position of the target microservice entity device with reference to a load status of each target microservice entity device on the target service chain and the transmission delay between the target microservice entity devices, to effectively reduce the service response time of the target service chain after deployment adjustment.

Figure 1D:
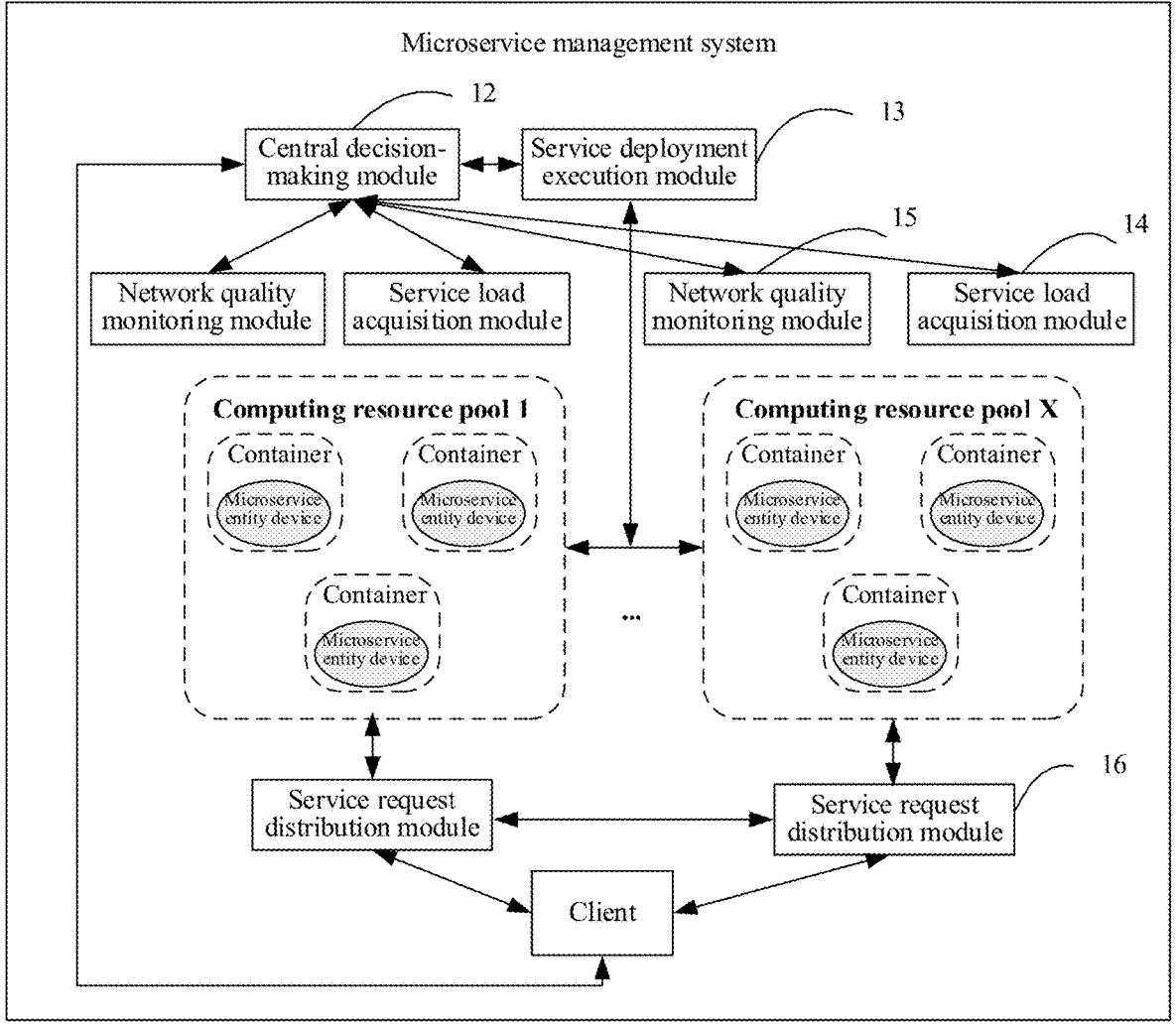
FIG. 1d is a schematic structural diagram of another microservice management system according to an embodiment of the present disclosure.

Referring to FIG. 1d, in an embodiment, the microservice deployment device may include a central decision-making module 12, a service deployment execution module 13, a plurality of service load acquisition modules 14, a plurality of network quality monitoring modules 15, and a plurality of service request distribution modules 16. Both the central decision-making module 12 and the service deployment execution module 13 are disposed in the central cloud environment. The central decision-making module 12 is configured to: obtain the service processing information of the target service chain, and generate the deployment update configuration information according to the service processing information of the target service chain; and the service deployment execution module 13 is configured to adjust the deployment position of each target microservice entity device on the target service chain according to the deployment update configuration information.

Each computing resource pool is separately provided with a service load acquisition module 14, a network quality monitoring module 15, and a service request distribution module 16. The service load acquisition module 14 is configured to: acquire load information of each microservice entity device in the computing resource pool to which the service load acquisition module belongs, and report the acquired load information to the central decision-making module 12; the network quality monitoring module 15 is configured to: acquire a transmission delay between microservice entity devices in the computing resource pool to which the network quality monitoring module belongs, and report the acquired transmission delay to the central decision-making module 12; and The service request distribution module 16 is configured to maintain a request forwarding table in the microservice management system, and when receiving a service request sent by the client, may distribute the service request to a specified microservice entity device based on the request forwarding table. Further, the service request distribution module may subsequently update the request forwarding table according to the deployment update configuration information, and forward, based on the updated request forwarding table, the service request to a microservice entity device in a computing resource pool that performs service processing. The service load acquisition module 14 reports load information to the central decision-making module 12, and a reporting manner in which the network quality monitoring module 15 reports the transmission delay to the central decision-making module 12 may be either real-time reporting or periodic reporting. The reporting manner may not be specifically limited in this embodiment of the present disclosure.

Each service request distribution module 16 may be configured to maintain a request forwarding table corresponding to a computing resource pool to which the service request distribution module belongs, each request forwarding table includes at least one forwarding table entry, and each forwarding table entry includes: a service identifier, a target identifier, and a forwarding weight. The service request distribution module 16 may configure and forward the service request based on the request forwarding table. Specifically, the service request distribution module 16 may establish a request forwarding table shown in Table 1. The service identifier is used for representing a specific microservice, and the target identifier is marked by a data combination (an IP address and a port), to indicate an IP address and a working port of the microservice entity device corresponding to the forwarding table entry. The IP address in the table entry may be a host address in the computing resource pool in which the service request distribution module 16 is located, or may be a host address in another computing resource pool. The forwarding weight is a weight value between 0 and 1, and is used for representing a probability of forwarding the service request to the microservice entity device indicated by the target identifier. The central decision-making module 12 may distribute and adjust, by adjusting the weight value, service traffic between different microservice entity devices that provide a same microservice.

TABLE 1

| Table entry ID | Service identifier | Target identifier | Forwarding weight |
|---|---|---|---|
| 1 | Identifier 1 | (IP1, port 1) | Weight 1 |
| 2 | Identifier 2 | (IP2, port 2) | Weight 2 |

The update of the forwarding table entry in the request forwarding table may be triggered by the deployment update configuration information issued by the central decision-making module 12 to the service request distribution module 16. If creating a microservice entity device in the computing resource pool in which the service request distribution module 16 is located, the central decision-making module 12 adds a forwarding table entry corresponding to the microservice entity device to the request forwarding table. If closing a microservice entity device in the computing resource pool in which the service request distribution module 16 is located, the central decision-making module 12 deletes a forwarding table entry corresponding to the microservice entity device to the request forwarding table.

In an embodiment, the central decision-making module 12 may be specifically configured to generate service processing information of the target service chain according to the load information reported by the service load acquisition module 14 and the transmission delay reported by the network quality monitoring module 15, the service processing information at least including a service response time.

In an embodiment, the central decision-making module 12 may be further configured to construct a plurality of virtual service chains corresponding to the target service chain, each of the virtual service chains including at least one microservice entity device, the at least one microservice entity device being from at least one of the computing resource pools; and each of the virtual service chains having a virtual service response time. Further, the central decision-making module 12 may select a target virtual service chain with a shortest virtual service response time from the plurality of virtual service chains; when a service response time of the target virtual service chain meets a target service response time condition, generate the deployment update configuration information according to a deployment position of each microservice entity device in the target virtual service chain; and may subsequently adjust the deployment position of each target microservice entity device on the target service chain based on the deployment update configuration information. The target service response time condition herein may be determined according to a service response time of the target service chain. Generally, the service response time of the target virtual service chain that meets the target service response time condition is less than the service response time of the target service chain. It can be learned that in any embodiment of the present disclosure, the deployment of each target microservice entity device on the target service chain may be adjusted based on a target virtual service chain with a shorter service response time, to reduce a global service response time of the target service chain.

It can be learned from the above that the microservice management system provided in the embodiments of the present disclosure is a cloud-edge collaboration microservice management system. Some services may be transferred to the microservice entity device in the edge cloud environment for processing, instead of transferring all services to the microservice entity device in the central cloud environment for processing. Because the edge cloud environment is closer to the client, correspondingly, the microservice entity device in the edge cloud environment may respond to the service faster. Compared with the above-mentioned computing microservice application center and the microservice task center that are oriented to a centralized cloud computing environment, such a cloud-edge collaboration system used help reduce the global service response time and the computing load of the central cloud environment. For example, a cloud game is used as an example. The microservice such as a game screen rendering service transferred to the edge cloud environment performs game screen rendering, so that switching of the game screen is smoother. The microservice such as a user permission verification service transferred to central cloud environment performs user permission verification, to improve the security of user information and the accuracy of permission verification.

Although the microservice task center may implement the service system across the edge cloud and the central cloud through a distributed message queue, distributed deployment of the message queue negatively affects the manner in which the microservice task center performs task scheduling based on the priority of the service request. Because the task events are stored in different message queues located in the edge cloud and the central cloud, and these message queues are controlled by different task schedulers, such control by task schedulers requires that complex coordination between a plurality of task schedulers needs to be performed to implement priority scheduling. On one hand, the service response time is increased due to additional coordination between the task schedulers. On the other hand, because the microservice entity device needs to report a load status to each distributed task scheduler, a sharp increase in a microservice monitoring overhead is also caused. In the microservice management system provided in the embodiments of the present disclosure, the task scheduling is completed based on the request forwarding table by the service request distribution module 16 deployed in each computing resource pool. The request forwarding table is uniformly managed by the central decision-making module 12 in the central cloud environment. In other words, in the microservice management system of the present disclosure, task scheduling is uniformly managed by the central decision-making module 12. Compared with the microservice task center, during task scheduling, on one hand, there is no need to perform complex coordination between the plurality of task schedulers, to help improve the efficiency of the task scheduling; and on the other hand, there is no need for the microservice entity device to report the load status to each distributed task scheduler, and no additional monitoring overhead is caused.

Figure 2:
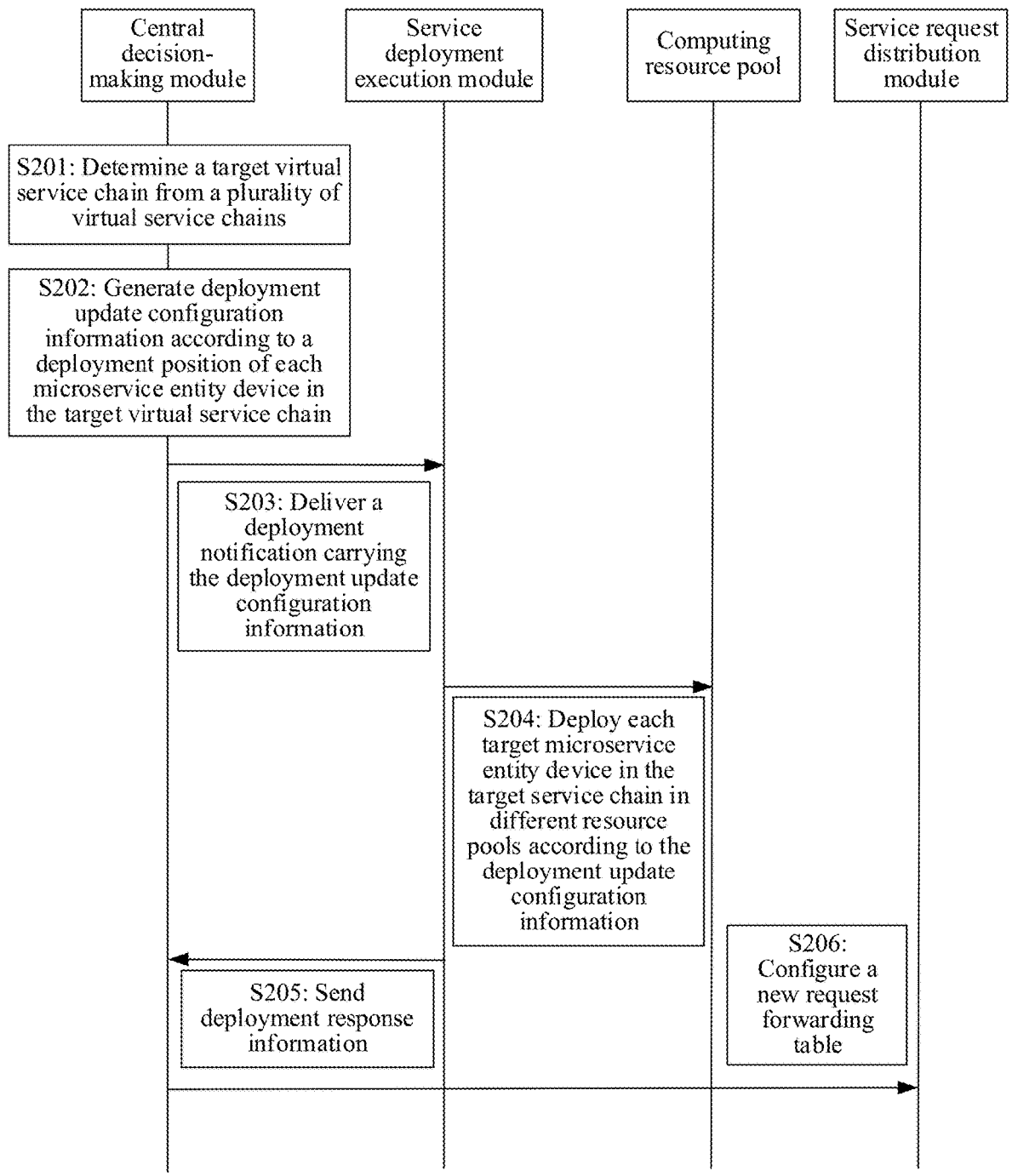
FIG. 2 is a schematic interaction flowchart of a microservice deployment method according to an embodiment of the present disclosure.

Based on the microservice management system described in FIG. 1d, the embodiments of the present disclosure provide a microservice deployment method. As shown in FIG. 2, the central decision-making module performs operation S201: determining a target virtual service chain from a plurality of virtual service chains, the target virtual service chain being a virtual chain with a shortest virtual service response time in the plurality of virtual service chains, the shortest virtual service response time being less than a service response time of a target service chain. Further, the central decision-making module performs operation S202: generating deployment update configuration information according to a deployment position of each microservice entity device in the target virtual service chain, and performs operation S203: delivering a deployment notification carrying the deployment update configuration information to the service deployment execution module. The service deployment execution module may perform operation S204: deploying each target microservice entity device on the target service chain in different resource pools according to the deployment update configuration information (that is, adjusting the deployment position of each target microservice entity device on the target service chain). Further, after determining that the deployment of each target microservice entity device on the target service chain is completed, the service deployment execution module may perform operation S205: sending deployment response information to the central decision-making module. The central decision-making module may determine, based on the deployment response information, that the deployment of each target microservice entity device on the target service chain is completed, perform operation S206: configuring a new request forwarding table for the service request distribution module in a computing resource pool in which the target microservice entity device is deployed, and after the configuration of the request forwarding table is completed, determine that the current adjustment on the deployment for the target microservice entity device is completed. Subsequently, each service request distribution module deployed in each computing resource pool may forward, based on a respective maintained request forwarding table, the service request from the client to a specified microservice entity device in the computing resource pool to which the service request distribution module belongs for processing. It can be learned that in any embodiment of the present disclosure, the deployment of each target microservice entity device in the target service chain may be adjusted based on a target virtual service chain with a shorter service response time, to reduce a global service response time of the target service chain.

Based on the above-mentioned description, the embodiments of the present disclosure provide a microservice deployment method. The microservice deployment method may be performed by the microservice deployment device in the microservice management system mentioned above. The microservice management system includes a plurality of computing resource pools and a running target service chain, a microservice entity device is disposed in each computing resource pool, the target service chain includes at least one target microservice entity device, and the at least one target microservice entity device is from at least one of the computing resource pools.

Figure 3:
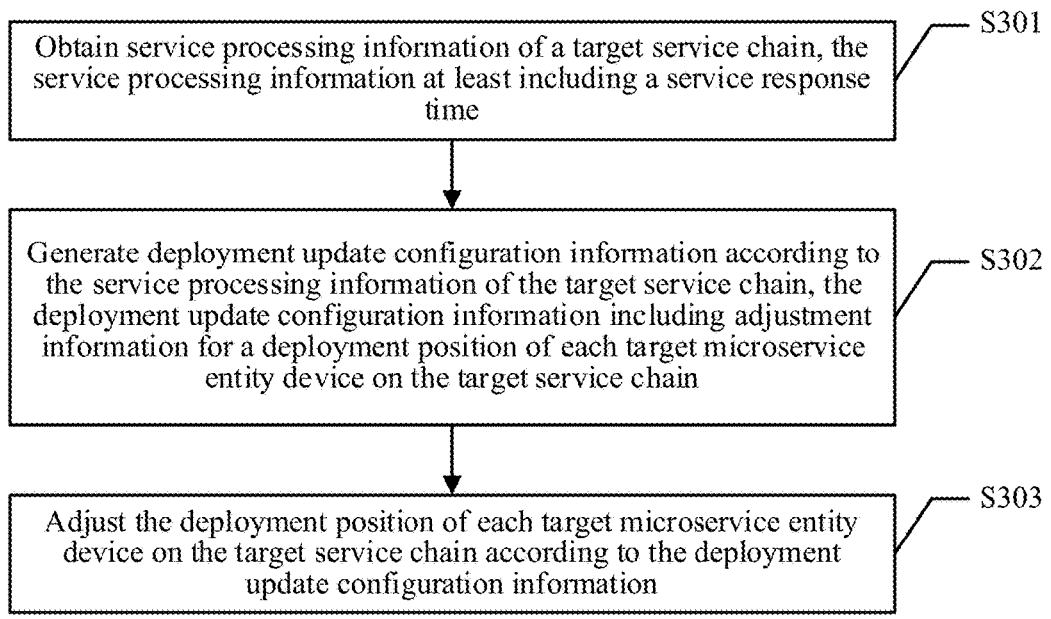
FIG. 3 is a schematic flowchart of a microservice deployment method according to an embodiment of the present disclosure.

Referring to FIG. 3, the microservice deployment method may include the following operation S301 to operation S303:

S301. Obtain service processing information of a target service chain, the service processing information at least including a service response time.

The service response time is determined based on load information of each target microservice entity device on the target service chain and a transmission delay between the target microservice entity devices. The microservice deployment device may obtain load information of each target microservice entity device on the target service chain, a transmission delay and a call relationship between the target microservice entity devices, generate a directed acyclic graph (DAG) corresponding to the target microservice entity on the target service chain based on the load information of each target microservice entity device, the transmission delay and the call relationship between the target microservice entity devices, and further determine a service response time of the target service chain according to a DAG critical path algorithm and based on the DAG.

Figure 4:
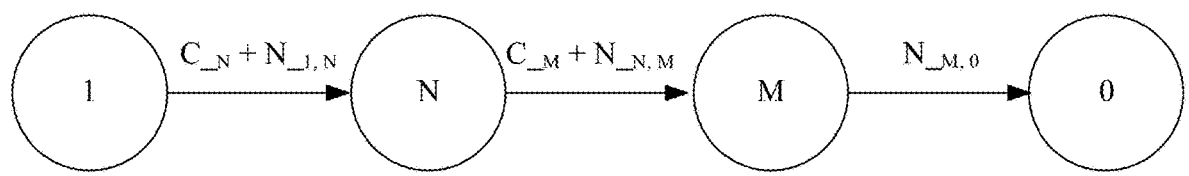
FIG. 4 is a directed acyclic graph (DAG) corresponding to a target service chain according to an embodiment of the present disclosure.

The load information represents a time consumed for the target microservice entity device to process a single service request, and the transmission delay represents a network transmission time required for data transmission between the target microservice entity devices. For example, assuming that the target microservice entity device includes a microservice entity device N (N being an integer greater than 0) and a microservice entity device M (M being an integer greater than 0), the above-mentioned directed acyclic graph (DAG) generated by the microservice deployment device may be shown in FIG. 4. A vertex N indicates that the microservice entity device N completes processing of a service request, where a vertex 1 indicates that the service request from the client reaches the microservice management system, and a vertex 0 indicates that the client receives a service response. An edge <N, M> in the DAG indicates that the microservice entity device N forwards a processing result to the microservice entity device M for further processing, an arrow direction of the edge <N, M> indicates that the processing result of the microservice entity device N is further transferred to the microservice entity device M for processing, and a specific meaning of a value on the edge <N, M> is as follows: C_M represents a time consumed by the microservice entity device M to complete the service processing, $N_{-N,M}$ represents a network transmission time required for the microservice entity device N to forward the processing result to the microservice entity device M, and $C_{-M}+N_{-N,\ M}$ is a sum of the two. A behavior of the microservice entity device N sending the processing result to the microservice entity device M is determined by the call relationship between the target microservice entity devices in the target service chain, and is related to specific service logic. When the microservice entity device N and the microservice entity device M are deployed in different computing resource pools, $N_{-N,\ M}$ is a network transmission delay between two resource pools. On the contrary, when the microservice entity device N and the microservice entity device M are deployed in a same computing resource pool, $N_{-N,\ M}$ is a network transmission delay within a single resource pool.

Further, the critical path corresponding to the DAG graph may be determined by using the DAG critical path method, summation is performed on values on all edges of the critical path, and a total duration obtained through summation is determined as a service response time of the running target service chain.

S302. Generate deployment update configuration information according to the service processing information of the target service chain, the deployment update configuration information including adjustment information for a deployment position of each target microservice entity device on the target service chain.

The microservice deployment device may construct a plurality of virtual service chains corresponding to the target service chain, each of the virtual service chains including at least one microservice entity device, the at least one microservice entity device being from at least one of the computing resource pools; and each of the virtual service chains having a virtual service response time. Further, a target virtual service chain with a shortest virtual service response time may be obtained from a plurality of virtual service chains. When a service response time of the target virtual service chain meets a target service response time condition, deployment update configuration information is generated according to a deployment position of each microservice entity device in the target virtual service chain. The target service response time condition is determined according to a service response time of the target service chain.

In an embodiment, the target service response time condition may include: a difference between the service response time of the target service chain and the virtual service response time of the target virtual service chain is greater than a threshold. For example, it is assumed that the service response time of the running target service chain is Ts (a number greater than 0), the shortest virtual service response time is Tv (a number greater than 0), and a threshold is T (a number greater than or equal to 0). When (Ts−Tv) is greater than T, the microservice deployment device may determine that the service response time of the target virtual service chain meets the target service response time condition.

Alternatively, in another embodiment, the above-mentioned target service response time condition may alternatively include: the virtual service response time of the target virtual service chain is less than the service response time of the target service chain by a specific threshold (for example, Tv is less than Ts by 10%).

In an embodiment, when there are a plurality of target virtual service chains with the shortest virtual service response time, the microservice deployment device may generate deployment update configuration information based on a deployment position of each microservice entity device on any target virtual service chain in the plurality of target virtual service chains. Alternatively, the microservice deployment device may detect resource consumption information of each microservice entity device on each target virtual service chain for the computing resource pool, determine a target virtual service chain with least resource consumption from a plurality of target virtual service chains based on the resource consumption information, and further generate deployment update configuration information based on a deployment position of each microservice entity device on a target virtual service chain with least resource consumption.

A specific implementation in which the microservice deployment device constructs a virtual service chain corresponding to the target service chain may be: detecting an initial deployment mode of the target microservice entity device on the target service chain, and constructing a virtual service chain corresponding to the target service chain based on the initial deployment mode of the target microservice entity device on the target service chain, a deployment mode of a microservice entity device on the virtual service chain being different from the initial deployment mode of the target microservice entity device on the target service chain. Further, the target microservice entity device on the target service chain is the same as the microservice entity device on the corresponding virtual service chain, and only the deployment positions may be different. Therefore, after the virtual service chain corresponding to the target service chain is constructed, a virtual service response time of the virtual service chain may be determined based on a manner similar to that of determining the service response time of the target service chain, and load information of each target microservice entity device on the virtual service chain and a transmission delay between the microservice entity devices.

For example, the running target service chain includes microservice entity devices A, B, and C, a call relationship among the three is: A→B→C, there are two resource pools: a computing resource pool 1 and a computing resource pool 2 in the microservice management system, and an initial deployment mode of the running target service chain is that: the microservice entity device A is run in the computing resource pool 1, and other microservice entity devices are run in the computing resource pool 2. It is assumed that the deployment mode of the virtual service chain is that: the microservice entity devices A and B are run in the computing resource pool 1, and the other microservice entity devices are run in the computing resource pool 2. It can be learned from the above-mentioned content that when the microservice entity device N and the microservice entity device M are deployed in different computing resource pools, $N_{-N, M}$ is a network transmission delay between the two resource pools. Therefore, a network transmission between the microservice entity devices B and C in the virtual service chain is equivalent to a network transmission delay between the computing resource pool 1 and the computing resource pool 2. The network transmission delay between the computing resource pool 1 and the computing resource pool 2 may be directly obtained by the microservice deployment module; and deployment positions of the microservice entity devices A and B are in different computing resource pools on the running target service chain, but are in the same computing resource pool 1 on the virtual service chain. It can be learned that a network transmission delay between the microservice entity devices A and B on the target service chain is different from a network transmission delay on the virtual service chain. The microservice deployment device obtains a network transmission delay in advance set for the computing resource pool 1, and determines the network transmission delay set for the computing resource pool 1 as the network transmission delay between the microservice entity devices A and B on the virtual service chain. Further, a virtual service response time of the virtual service chain may be determined based on load information of each target microservice entity device on the virtual service chain and a transmission delay between the microservice entity devices.

In an embodiment, the microservice deployment device may list all deployment modes of the target microservice entity device on the target service chain in the computing resource pools by using an exhaustive method; and construct, for the target microservice entity device, a virtual service chain whose deployment mode is a target deployment mode, the target deployment mode being a deployment mode other than the initial deployment mode in all the deployment modes.

For example, the running target service chain includes target microservice entity devices A, B, and C, there are a total of two resource pools: a computing resource pool 1 and a computing resource pool 2 in the microservice management system, and an initial deployment mode of the running target service chain is that: the target microservice entity device A is run in the computing resource pool 1, and other target microservice entity devices are run in the computing resource pool 2, and all deployment modes of all the target microservice entity devices on the target service chain in the computing resource pool 1 and the computing resource pool 2 are listed by using the exhaustive method. Further, the initial deployment mode of the currently running target service chain is deleted, and a target deployment mode of the constructed virtual service chain may be shown in Table 2.

TABLE 2

| | Computing resource pool 1 | Computing resource pool 2 |
|---|---|---|
| Deployment mode 1 | Microservice entity device B Microservice entity device C | Microservice entity device A |
| Deployment mode 2 | Microservice entity device A Microservice entity device B Microservice entity device C | |
| Deployment mode 3 | Microservice entity device A Microservice entity device B | Microservice entity device C |
| Deployment mode 4 | Microservice entity device B | Microservice entity device A Microservice entity device C |
| Deployment combination 5 | Microservice entity device C Microservice entity device A | Microservice entity device B |
| Deployment mode 6 | | Microservice entity device A Microservice entity device B Microservice entity device C |
| Deployment mode 7 | Microservice entity device C | Microservice entity device A Microservice entity device B |

S303. Adjust the deployment position of each target microservice entity device on the target service chain according to the deployment update configuration information.

The computing resource pool may include at least one of a central computing resource pool and an edge computing resource pool, the central computing resource pool is disposed in a central cloud environment, and the edge computing resource pool is disposed in an edge cloud environment, and the target microservice entity device on the target service chain is from at least one of the computing resource pools. The microservice deployment device may adjust the deployment position of each target microservice entity device on the target service chain in the central computing resource pool and/or the edge computing resource pool according to the deployment update configuration information.

In an embodiment, the adjustment information included in the deployment update configuration information may be used for instructing to add or delete one or more target microservice entity devices in a target computing resource pool, and the microservice deployment device may correspondingly add or delete one or more target microservice entity devices from the target computing resource pool based on the instruction of the adjustment information. For example, if the adjustment information instructs to add the microservice entity device A to the central computing resource pool 1, the microservice deployment device may add and deploy the microservice entity device A to the central computing resource pool 1 based on the instruction of the adjustment information.

Further, after the microservice deployment device adjusts the deployment position of each target microservice entity device on the target service chain in the central computing resource pool and/or the edge computing resource pool according to the deployment update configuration information, in a case of detecting that a deployment position of an initial microservice entity device that first processes a service request on the target service chain is adjusted from the edge computing resource pool to the central computing resource pool, a request forwarding notification may be transmitted to a microservice deployment device deployed in the edge computing resource pool, the request forwarding notification being used for instructing the microservice deployment device deployed in the edge computing resource pool to forward the service request to a microservice deployment device deployed in the central computing resource pool. Further, the microservice deployment device deployed in the central computing resource pool may distribute the service request to an initial microservice entity device, which is processing by the initial microservice entity device.

It may be understood that, the microservice management system in any embodiment of the present disclosure may include a plurality of microservice deployment devices, and the microservice deployment devices deployed in the central cloud environment may be configured to perform the above-mentioned operation S301 to operation S303. In addition, at least one microservice deployment device may be deployed for each computing resource pool, where the at least one microservice deployment device corresponding to each computing resource pool may include a first type of deployment device and a second type of deployment device. The first type of deployment device may be configured to deploy a container that supports running of the microservice entity device, so that the microservice entity device may be run in a container environment. The second type of deployment device may be configured to manage a computing resource pool to which the second type of deployment device belongs, and is equivalent to a management server. The management may include maintaining a request forwarding table corresponding to the computing resource pool to which a device belongs, forwarding of a service request (for example, distributing, based on the request forwarding table, a service request to the microservice entity device in the computing resource pool to which the microservice entity device belongs, and based on a request forwarding notification issued by the microservice deployment device located in the central cloud environment, forwarding a service request to a microservice deployment device deployed in another computing resource pool after the service request is received), management of the container (for example, adding or deleting the container in the computing resource pool to which the device belongs).

In an embodiment, before the generating deployment update configuration information according to a deployment position of each microservice entity device in the target virtual service chain, for a microservice entity device configured to provide a same microservice, the microservice deployment device may further compare whether the deployment position of the microservice entity device in the target virtual service chain is the same as the deployment position of each target microservice entity device on the target service chain; and when the deployment positions of the two are different, generate the deployment update configuration information according to the deployment position of the microservice entity device in the target virtual service chain.

Specifically, after the deployment position of each microservice entity device in the target virtual service chain is compared with the deployment position of each target microservice entity device on the target service chain, if it is determined through comparison that the deployment position of the microservice entity device that provides the same microservice on the target virtual service chain is different from the deployment position on the target service chain, it may be determined that the deployment positions on the target virtual service chain and the target service chain are different. For example, if a deployment position of a microservice entity device that provides a microservice 1 on the target virtual service chain is in the central computing resource pool, and a deployment position of each target microservice entity device that provides the microservice 1 on the target service chain is in the edge computing resource pool, it may be determined that the deployment positions corresponding to the target virtual service chain and the target service chain are different.

In an embodiment, each computing resource pool corresponds to one of the request forwarding table, and each request forwarding table includes a forwarding table entry corresponding to a microservice entity device in a computing resource pool corresponding to the microservice entity device, and a forwarding table entry of a microservice entity device that has a call relationship with the microservice entity device in the computing resource pool corresponding to the microservice entity device. Each request forwarding table includes at least one forwarding table entry, and each forwarding table entry includes: a service identifier, a target identifier, and a forwarding weight. The microservice deployment device may update the request forwarding table according to the deployment update configuration information, the target identifier being used for indicating an IP address and a working port of a microservice entity device corresponding to the forwarding table entry, the forwarding weight being used for indicating a probability of forwarding a service request to the microservice entity device indicated by the target identifier; and Further, when a service request is received, the service request may be forwarded, according to the forwarding weight in the request forwarding table, to a microservice entity device that performs service processing in each computing resource pool.

The above-mentioned deployment update configuration information may further include first configuration information. After the deployment position of each microservice entity device in the target virtual service chain is compared with the deployment position of each target microservice entity device on the target service chain, first configuration information corresponding to a target microservice entity device with a different deployment position may be obtained. The first configuration information includes a service identifier of the target microservice entity device with the different deployment position, a target identifier corresponding to the target microservice entity device on the target virtual chain, and a forwarding weight for forwarding a service request to the target microservice entity device based on the target identifier; or may further include second configuration information corresponding to a microservice entity device that has a call relationship with a target microservice entity device with a deployment position different from the above-mentioned deployment position. The microservice deployment device may update the request forwarding table based on the first configuration information and the second configuration information.

Figure 5:
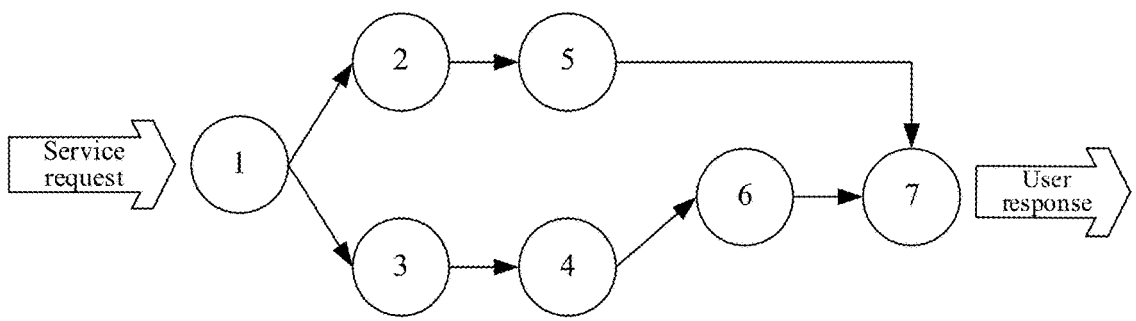
FIG. 5 shows a call relationship between microservices according to an embodiment of the present disclosure.
Figure 6:
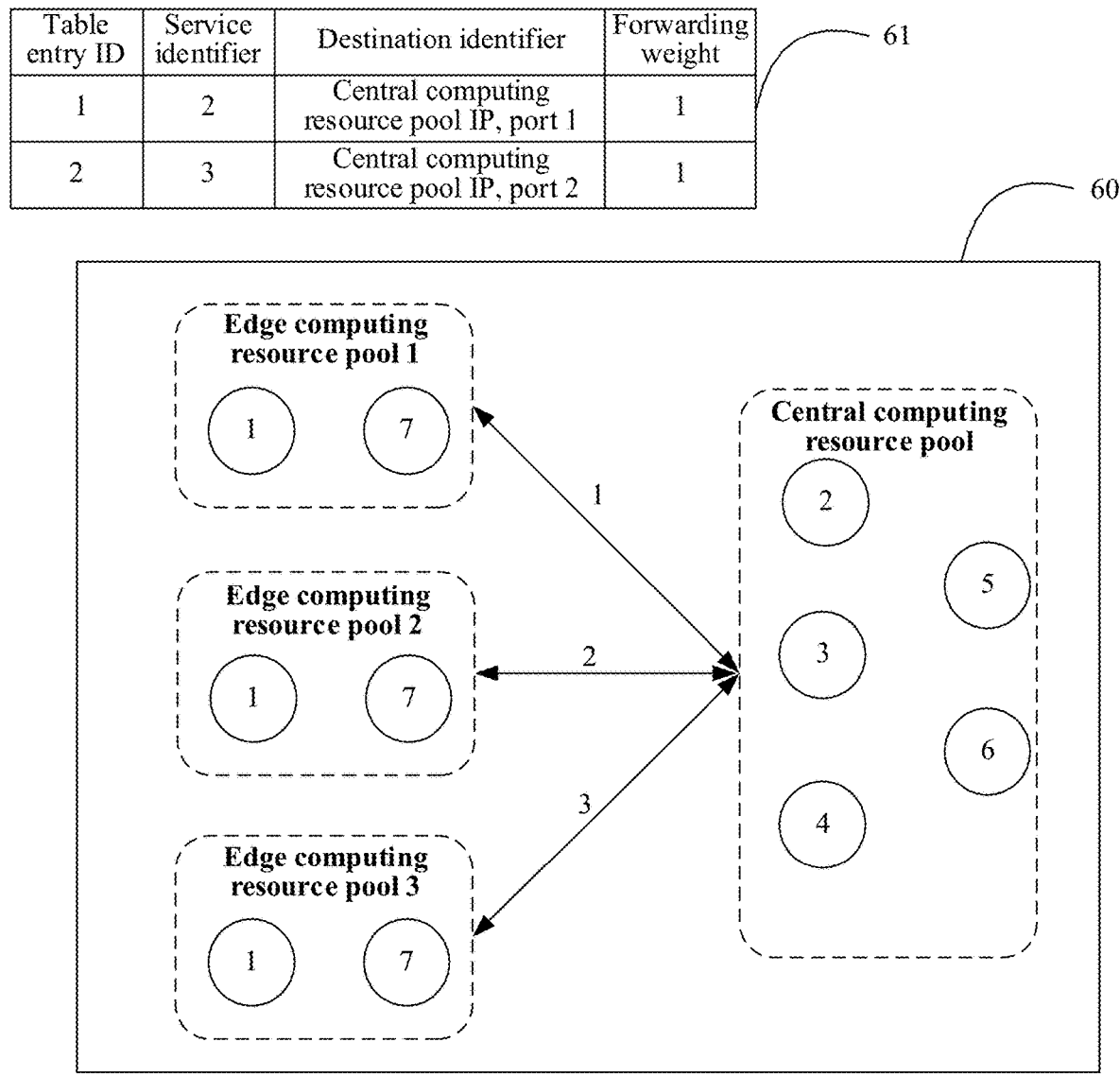
FIG. 6 is a schematic diagram of a target service chain before a deployment position adjustment according to an embodiment of the present disclosure.
Figure 7:
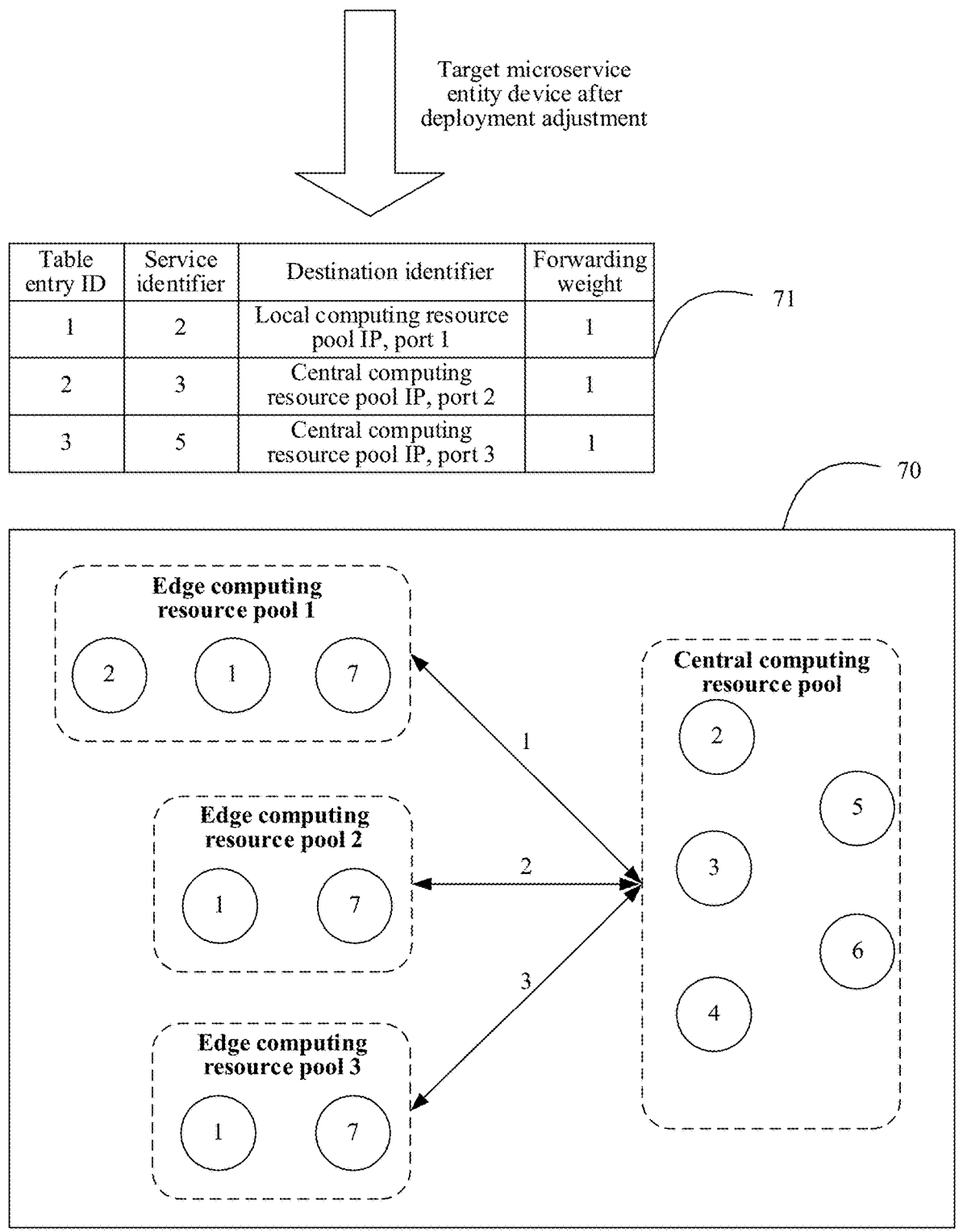
FIG. 7 is a schematic diagram of a target service chain after a deployment position adjustment according to an embodiment of the present disclosure.

For example, a process of transferring the microservice entity device from the central computing resource pool to the edge computing resource pool is used as an example. Referring to FIG. 5 to FIG. 7, it is assumed that the microservice management system includes 3 edge computing resource pools (numbered 1 to 3) and 1 central computing resource pool, the edge computing resource pool and the central computing resource pool are connected to each other through the network, system service logic is formed by the call relationship shown in FIG. 5, and entire service logic includes 7 microservices (numbered 1 to 7). FIG. 6 includes a position deployment image 60 of each target microservice entity device before deployment adjustment and a request forwarding table 61 corresponding to an edge computing pool. It can be learned from FIG. 6 that in an early running stage of the system, each edge computing resource pool has 2 target microservice entity devices configured to run a microservice 1 and a microservice 7 respectively, remaining microservices are all run in target microservice entity devices provided in a central computing resource pool, and there are a total of 3 running target service chains (numbered 1 to 3) in the entire system. Because microservices provided in each edge computing resource pool are the same, correspondingly, a request forwarding table corresponding to each edge computing pool is also the same. FIG. 7 includes a position deployment image 70 of each target microservice entity device after deployment adjustment and a request forwarding table 71 corresponding to an edge computing resource pool 1.

The microservice deployment device may obtain load information of each target microservice entity device on the target service chain, and a transmission delay between the target microservice entity devices; and calculate a service response time of each target service chain by using a DAG critical path algorithm. It is assumed that the service response time of each target service chain is calculated as $Ts\_1=Ts\_2=Ts\_3=2$ seconds.

Further, for each existing target service chain, the microservice deployment device separately generates 127 virtual service chains, and according to load information of each microservice entity device on the acquired virtual service chains and the transmission delay between the microservice entity devices, calculates a service response time of each virtual service chain by using the DAG critical path method. For the existing target service chain, a specific deployment manner in the above-mentioned virtual service chain has a shortest service response time, and a value of the shortest service response time is separately $Tv\_1=Tv\_2=Tv\_3=2.3$ seconds. Because a service response time of each existing target service chain is less than a service response time of the virtual service chain, the microservice deployment device does not need to adjust deployment of the target microservice entity device on the target service chain.

However, with the running of the system, assuming that the quality of a network connection between the edge computing resource pool 1 and the central computing resource pool, the microservice deployment device finds $Ts\_1=3.7$ seconds through calculation, and a target virtual service chain in the above-mentioned 127 virtual service chains (where a deployment manner corresponding to the target virtual service chain is that the microservice entity device 1 is deployed in the edge computing resource pool 1, deployment positions of remaining microservice entity devices are the same as a deployment position on a target service chain numbered 1) has a shortest service response time $Tv\_1=2.5$ seconds. The microservice deployment device may generate deployment update configuration information based on a deployment position of each microservice entity device in the target virtual service chain, and adjust the deployment position of each target microservice entity device on the target service chain according to the deployment update configuration information.

The above-mentioned specific adjustment may be creating a microservice entity device in the edge computing resource pool 1 for running a microservice 2, and updating the request forwarding table corresponding to the edge computing resource pool 1. The update of the request forwarding table corresponding to the edge computing resource pool 1 includes: modifying a forwarding table entry, and forwarding a request for the microservice 2 to a local microservice entity device. In addition, a forwarding table entry is added, and a request for the microservice 5 is forwarded to the central computing resource pool. This is because the local newly added microservice 2 needs to invoke the microservice 5 deployed in the central computing resource pool.

It can be learned from the request forwarding table 71 corresponding to the edge computing resource pool 1 that the request forwarding table 71 is obtained by updating the request forwarding table 61 by the microservice deployment device based on first configuration information (a service identifier of a microservice entity device 2, a target identifier corresponding to the microservice entity device 2 on a target virtual chain, and a forwarding weight for forwarding a service request based on the target identifier) and second configuration information (a service identifier of a microservice entity device 5, a target identifier corresponding to the microservice entity device 5 on a target virtual chain, and a forwarding weight for forwarding a service request based on the target identifier) respectively corresponding to the microservice entity device 2 and the microservice entity device 5). The microservice entity device 2 may be understood as a target microservice entity device with a different deployment position obtained through comparing the deployment position of the microservice entity device in the target virtual service chain with the deployment position of each target microservice entity device on the target service chain, and the microservice entity device 5 may be understood as a microservice entity device that has a call relationship with the microservice entity device 2.

Further, after the above-mentioned operations are completed, the target service chain numbered 1 in the microservice management system changes, and the changed target service chain runs in the following manner: the microservices 1, 2 and 7 perform operations in the edge computing resource pool 1, and a processing result of the microservice 2 is then returned to the central computing resource pool through the network. Finally, after the microservices 3 to 6 in the central computing resource pool complete service processing, the microservice 7 then returns a final result to the client.

Figure 8:
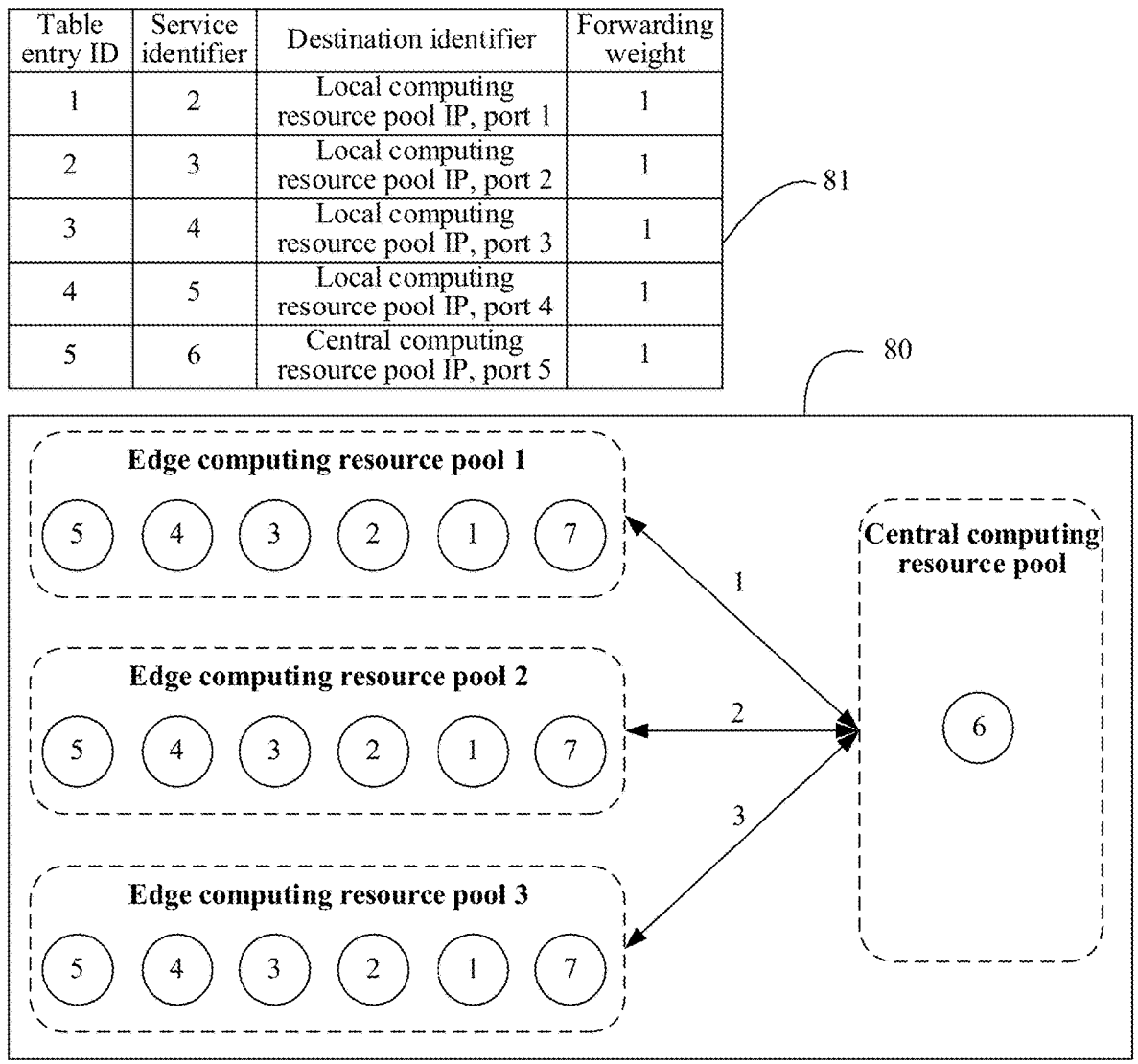
FIG. 8 is another schematic diagram of a target service chain before a deployment position adjustment according to an embodiment of the present disclosure.
Figure 9:
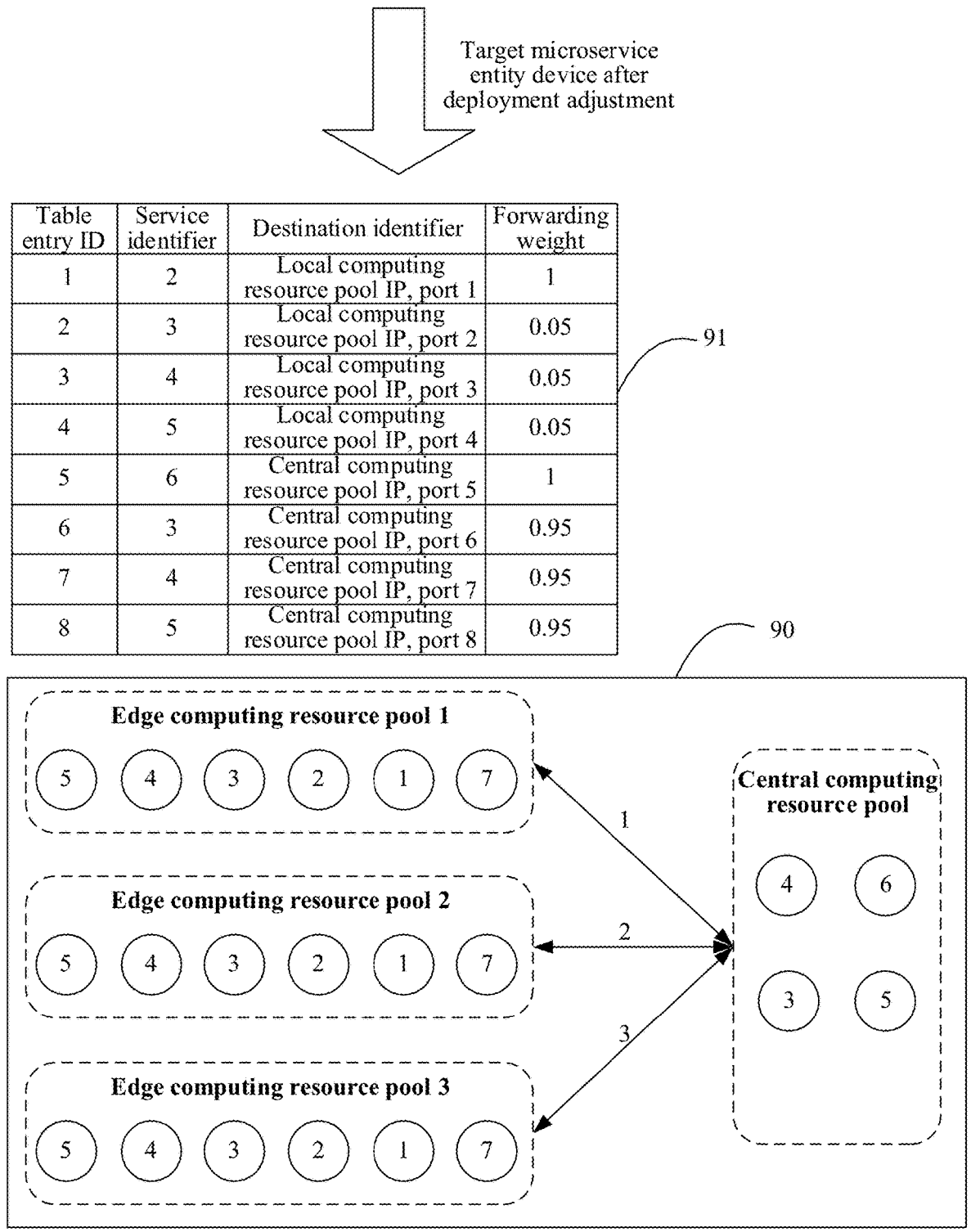
FIG. 9 is still another schematic diagram of a target service chain after a deployment position adjustment according to an embodiment of the present disclosure.

For example, the process of transferring the microservice entity device from the edge computing resource pool to the central computing resource pool is used as an example. Referring to FIG. 5, FIG. 8, and FIG. 9, it is assumed that the microservice management system includes 3 edge computing resource pools (numbered 1 to 3) and 1 central computing resource pool, the edge computing resource pool and the central computing resource pool are connected to each other through the network, system service logic is formed by the call relationship shown in FIG. 5, and entire service logic includes 7 microservices (numbered 1 to 7). As shown in FIG. 8, in an early running stage of the system, each edge computing resource pool has 6 target microservice entity devices configured to run microservices 1 to 5 and a microservice 7 respectively, and a remaining microservice 6 is run in a target microservice entity device provided in the central computing resource pool. Therefore, there are a total of 3 service chains (numbered 1 to 3) in the entire system.

The microservice deployment device may obtain load information of each target microservice entity device on each target service chain, and a transmission delay between the target microservice entity devices; and calculate a service response time of each target service chain by using a DAG critical path algorithm. It is assumed that the service response time of each target service chain is calculated as $Ts\_1=Ts\_2=Ts\_3=2$ seconds.

For each existing target service chain, the microservice deployment device separately generates 127 virtual service chains, and according to load information of each microservice entity device on the acquired virtual service chains and the transmission delay between the microservice entity devices, calculates a service response time of each virtual service chain by using the DAG critical path method. For each existing target service chain, it is assumed that a specific deployment manner in the above-mentioned virtual service chain has a shortest service response time, and a value of the shortest service response time is separately $Tv\_1=Tv\_2=Tv\_3=2.3$ seconds. Because each service response time of the existing target service chain is less than the service response time of the virtual service chain, the microservice deployment device does not need to adjust the deployment of the microservice entity device.

However, with the running of the system, assuming that a service request amount of the edge computing resource pool 1 increases, computing resources in the edge computing resource pool begin to be insufficient, and each service request needs to wait for a long time to obtain the computing resource for service. Because computing resources in the central computing resource pool are more abundant than those in the edge computing resource pool, the central decision-making module obtains $Ts\_1=3.7$ seconds through calculation, and a target virtual service chain in the above-mentioned 127 virtual service chains (where a deployment manner corresponding to the target virtual service chain is that: the microservice entity devices 3 to 5 are deployed in the edge computing resource pool 1, and deployment positions of remaining microservice entity devices are the same as the deployment position on the target service chain numbered 1) has $Tv\_1=2.5$ seconds. In such embodiments the microservice deployment device may generate deployment update configuration information based on a deployment position of each microservice entity device in the target virtual service chain, and adjust the deployment position of each target microservice entity device on the target service chain according to the deployment update configuration information.

The above-mentioned specific adjustment may be adding a microservice entity device to the central computing resource pool for running the microservices 3 to 5, and updating the request forwarding table corresponding to the edge computing resource pool 1. The update of the request forwarding table corresponding to the edge computing resource pool 1 includes: adding three forwarding table entries, and forwarding requests for the microservices 3 to 5 to the microservice entity device in the central computing resource pool according to a weight of 0.95. In addition, the microservice deployment device modifies original three forwarding table entries, and forwards the requests for the microservices 3 to 5 to a local computing resource pool according to a weight of 0.05. The weights 0.95 and 0.05 are preset based on experimental data.

After the above-mentioned operations are completed, the entire microservice management system has 4 service chains. In addition to the original 3 service chains, the newly added service chain runs in the following manner. The microservices 1, 2, and 7 perform operations in the edge computing resource pool 1, and a processing result of the microservice 2 is then returned to the central computing resource pool through the network. Finally, after the microservices 3 to 6 in the central computing resource pool complete service processing, the microservice 7 returns results to the client, and the newly added service chain undertakes 95% of service increment.

In an actual application, each microservice entity device may be configured to provide a service during service processing, the services may include a game service, an IoV service, a live streaming service, an industrial Internet service, or the like, and the microservice entity devices deployed in different types of computing resource pools may be configured to provide different types of services. An application scenario of the game service is used as an example. A service provided by the microservice entity device in the edge computing resource pool may be a game screen rendering service. Because the edge cloud environment is relatively close to the client, the game screen rendering service is provided by the microservice entity device in the edge computing resource pool, which helps improve the smoothness of game screen switching; and a service provided by the microservice entity device in the central computing resource pool may be a user permission verification service. Because the central cloud environment has higher security, the user permission verification service is provided by the microservice entity device in the central computing resource pool, which helps improve the security of user information and the accuracy of permission verification.

In an embodiment of the present disclosure, the microservice deployment device may determine service processing information of a target service chain based on load information of each target microservice entity device on the target service chain and a transmission delay between the target microservice entity devices, generate deployment update configuration information according to the service processing information of the target service chain, and adjust a deployment position of each target microservice entity device on the target service chain according to the deployment update configuration information. In the process of adjusting the deployment position of each target microservice entity device, the deployment position of the target microservice entity device may be adaptively and flexibly adjusted with reference to a load status of each target microservice entity device and the transmission delay between the target microservice entity devices, to effectively reduce the service response time of the target service chain after deployment adjustment.

The embodiments of the present disclosure further provide a computer storage medium, storing program instructions, the program instructions, when executed, being configured to implement the methods described in the abovementioned embodiments.

Figure 10:
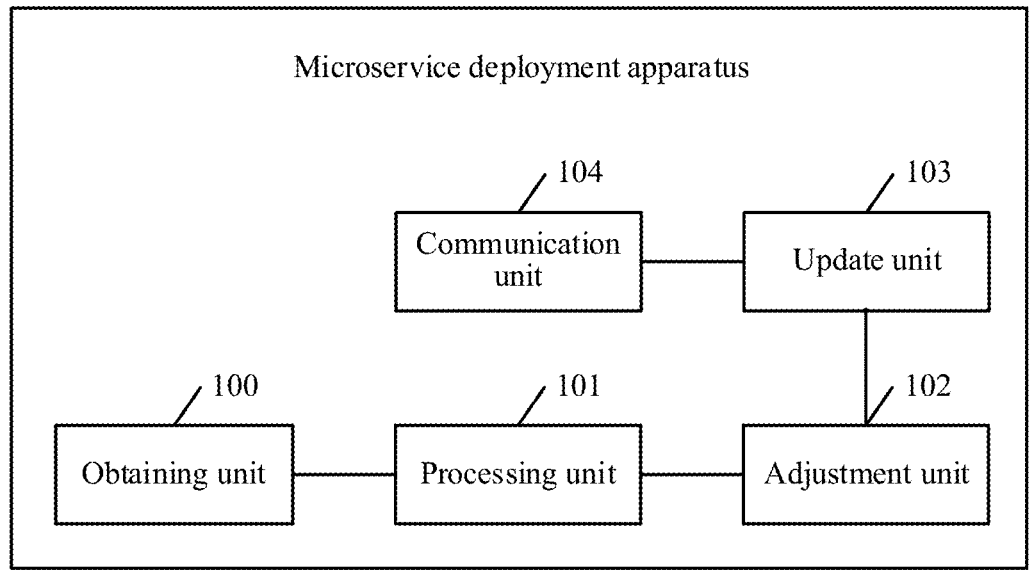
FIG. 10 is a schematic structural diagram of a microservice deployment apparatus according to an embodiment of the present disclosure.

FIG. 10 is a schematic structural diagram of a microservice deployment apparatus according to an embodiment of the present disclosure. In this embodiment of the present disclosure, the microservice deployment apparatus may be disposed in a microservice deployment device in a microservice management system, or may be a computer program (including program code) run in a microservice deployment device, and the microservice management system includes a plurality of computing resource pools and a target service chain; and the target service chain includes at least one target microservice entity device, and the at least one target microservice entity device being from at least one of the computing resource pools.

In an implementation of the apparatus in the embodiments of the present disclosure, the apparatus includes the following structures.

An obtaining unit 100 is configured to obtain service processing information of a target service chain, the service processing information including at least a service response time, the service response time being determined based on load information of each target microservice entity device on the target service chain and a transmission delay between the target microservice entity devices.

A processing unit 101 is configured to generate deployment update configuration information according to the service processing information of the target service chain, the deployment update configuration information including adjustment information for a deployment position of each target microservice entity device on the target service chain.

An adjustment unit 102 is configured to adjust the deployment position of each target microservice entity device on the target service chain according to the deployment update configuration information.

In an embodiment, the processing unit 101 is specifically configured to: construct a plurality of virtual service chains corresponding to the target service chain, each of the virtual service chains including at least one microservice entity device, the at least one microservice entity device being from at least one of the computing resource pools; and each of the virtual service chains having a virtual service response time; select a target virtual service chain with a shortest virtual service response time from the plurality of virtual service chains; and when a service response time of the target virtual service chain meets a target service response time condition, generate the deployment update configuration information according to a deployment position of each microservice entity device in the target virtual service chain, the target service response time condition being determined according to a service response time of the target service chain.

In an embodiment, the target service response time condition includes: a difference between the service response time of the target service chain and the virtual service response time of the target virtual service chain is greater than a threshold.

In an embodiment, the processing unit 101 is specifically configured to: for a microservice entity device configured to provide a same microservice, compare whether the deployment position of the microservice entity device in the target virtual service chain is the same as the deployment position of each target microservice entity device on the target service chain; and when the deployment positions of the two are different, generate the deployment update configuration information according to the deployment position of the microservice entity device in the target virtual service chain.

In an embodiment, the computing resource pool includes at least one of a central computing resource pool and an edge computing resource pool; the central computing resource pool is disposed in a central cloud environment, and the edge computing resource pool is disposed in an edge cloud environment; and the adjusting unit 102 is specifically configured to adjust the deployment position of each target microservice entity device on the target service chain in the central computing resource pool and/or the edge computing resource pool according to the deployment update configuration information.

In an embodiment, the apparatus further includes: an update unit 103, configured to update a request forwarding table according to the deployment update configuration information, the request forwarding table being used for instructing a microservice entity device that processes a service request.

In an embodiment, the request forwarding table includes at least one forwarding table entry, and each forwarding table entry includes: a service identifier, a target identifier, and a forwarding weight, the target identifier being used for indicating an IP address and a working port of a microservice entity device corresponding to the forwarding table entry, the forwarding weight being used for indicating a probability of forwarding a service request to the microservice entity device indicated by the target identifier; and the apparatus further includes: a communication unit 104, configured to, when a service request is received, forward, according to the forwarding weight in the request forwarding table, the service request to a microservice entity device that performs service processing in each computing resource pool.

In an embodiment, each computing resource pool corresponds to one of the request forwarding tables, and each request forwarding table includes a forwarding table entry corresponding to a microservice entity device in a computing resource pool to which the request forwarding table belongs, and a forwarding table entry of a microservice entity device that has a call relationship with the microservice entity device in the computing resource pool to which the request forwarding table belongs.

In an embodiment, the update unit 103 is specifically configured to add, delete, and modify at least one of the forwarding table entries in the request forwarding table.

In an embodiment, the communication unit 104 is further configured to, in a case of detecting that a deployment position of an initial microservice entity device that first processes a service request on the target service chain is adjusted from the edge computing resource pool to the central computing resource pool, transmit a request forwarding notification to a microservice deployment device deployed in the edge computing resource pool, the request forwarding notification being used for instructing the microservice deployment device deployed in the edge computing resource pool to forward the service request to a microservice deployment device deployed in the central computing resource pool.

In an embodiment, the obtaining unit 100 is specifically configured to: obtain load information of each target microservice entity device on the target service chain, and a transmission delay and a call relationship between the target microservice entity devices; based on the load information of each target microservice entity device, the transmission delay and the call relationship between the target microservice entity devices, generate a directed acyclic graph (DAG) corresponding to a target microservice entity device on the target service chain; and determine a service response time of the target service chain according to a DAG critical path algorithm and based on the DAG graph.

In an embodiment, the processing unit 101 is further configured to: detect an initial deployment mode of the target microservice entity device on the target service chain; and construct a virtual service chain corresponding to the target service chain based on the initial deployment mode of the target microservice entity device on the target service chain, a deployment mode of a microservice entity device on the virtual service chain being different from the initial deployment mode of the target microservice entity device on the target service chain.

In an embodiment, the processing unit 101 is further configured to: list all deployment modes of the target microservice entity device on the target service chain in the computing resource pools by using an exhaustive method; and construct, for the target microservice entity device, a virtual service chain whose deployment mode is a target deployment mode, the target deployment mode being a deployment mode other than the initial deployment mode in all the deployment modes.

In an embodiment, each microservice entity device is configured to provide a service during service processing, the service includes a game service or an IoV service, and microservice entity devices deployed in different types of computing resource pools are configured to provide different types of services.

In an embodiment of the present disclosure, for specific implementation of the above-mentioned units, refer to description of related content in the embodiments corresponding to the above-mentioned accompanying drawings.

In an embodiment of the present disclosure, the microservice deployment apparatus may determine service processing information of a target service chain based on load information of each target microservice entity device on the target service chain and a transmission delay between the target microservice entity devices, generate deployment update configuration information according to the service processing information of the target service chain, and adjust a deployment position of each target microservice entity device on the target service chain according to the deployment update configuration information. In the process of adjusting the deployment position of each target microservice entity device, the deployment of the target microservice entity device is adaptively and flexibly adjusted with reference to a load status of each target microservice entity device and the transmission delay between the target microservice entity devices, to effectively reduce the service response time of the target service chain after deployment adjustment.

Figure 11:
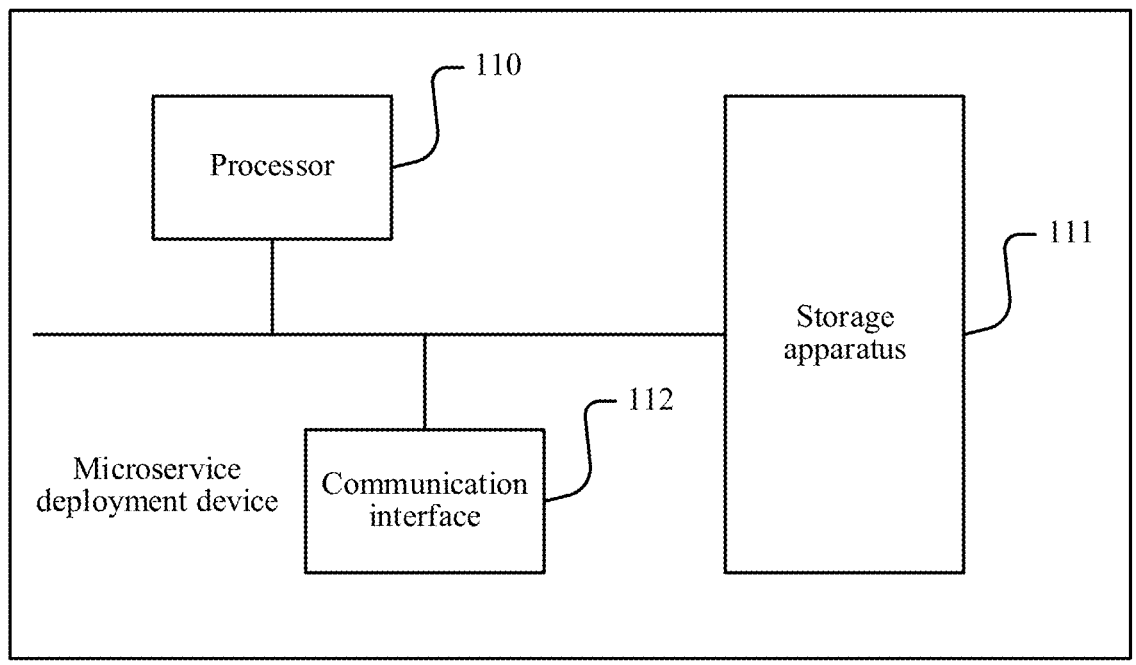
FIG. 11 is a schematic structural diagram of a microservice deployment device according to an embodiment of the present disclosure.

FIG. 11 is a schematic structural diagram of a microservice deployment device according to an embodiment of the present disclosure. The microservice deployment device may be a server or a server cluster included in the microservice management system, and the microservice management system includes a plurality of computing resource pools and a target service chain; and the target service chain includes at least one target microservice entity device, and the at least one target microservice entity device being from at least one of the computing resource pools. The microservice deployment device in the embodiments of the present disclosure includes structures such as a power supply module, and includes a processor 110, a storage apparatus 111, and a communication interface 112. Data may be exchanged between the processor 110, the storage apparatus 111, and the communication interface 112, and the processor 110 implements a corresponding microservice deployment function.

The storage apparatus 111 may include a volatile memory such as a random-access memory (RAM); or the storage apparatus 111 may include a non-volatile memory such as a flash memory or a solid-state drive (SSD); or the storage apparatus 111 may include a combination of the above-mentioned types of memories.

The processor 110 may be a central processing unit (CPU) 110. In an embodiment, the processor 110 may be further a graphics processing unit 110 (GPU). The processor 110 may alternatively be a combination of a CPU and a GPU. In the microservice deployment device, a plurality of CPUs and GPUs may be included as required to perform corresponding microservice deployment.

In an embodiment, the storage apparatus 111 is configured to store program instructions. The processor 110 may call the program instructions to implement the above-mentioned methods invoked in the embodiments of the present disclosure.

In a first exemplary implementation, the processor 110 of the microservice deployment device invokes the program instructions stored in the storage apparatus 111, configured to: obtain service processing information of a target service chain, the service processing information including at least a service response time, the service response time being determined based on load information of each target microservice entity device on the target service chain and a transmission delay between the target microservice entity devices; generate deployment update configuration information according to the service processing information of the target service chain, the deployment update configuration information including adjustment information for a deployment position of each target microservice entity device on the target service chain; and adjust the deployment position of each target microservice entity device on the target service chain according to the deployment update configuration information.

In an embodiment of the present disclosure, for specific implementation of the processor 110, refer to description of related content in the embodiments corresponding to the above-mentioned accompanying drawings.

In an embodiment of the present disclosure, the microservice deployment device may determine service processing information of a target service chain based on load information of each target microservice entity device on the target service chain and a transmission delay between the target microservice entity devices, generate deployment update configuration information according to the service processing information of the target service chain, and adjust a deployment position of each target microservice entity device on the target service chain according to the deployment update configuration information. In the process of adjusting the deployment position of each target microservice entity device, the deployment of the target microservice entity device is adaptively and flexibly adjusted with reference to a load status of each target microservice entity device and the transmission delay between the target microservice entity devices, to effectively reduce the service response time of the target service chain after deployment adjustment.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

A person of ordinary skill in the art would understand that some or all procedures in the method in the above-mentioned embodiments may be implemented by a computer program instructing related hardware. The program may be stored in a computer-readable storage medium, and when the program is executed, the procedures in the above-mentioned method embodiments may be implemented. The storage medium may be a magnetic disk, an optical disc, a read-only memory (ROM), a random access memory (RAM), or the like.

The above-mentioned descriptions are merely some example embodiments of the present disclosure, and are not intended to limit the scope of the present disclosure. A person skilled in the art would understand all or some processes of the above-mentioned embodiments, and equivalent modifications made according to the claims of the present disclosure still fall within the scope of the present disclosure.

What is claimed is:

1. A microservice management system, comprising:
a microservice deployment device;
a plurality of computing resource pools; and
a target service chain, the target service chain comprising at least one target microservice entity device, the at least one target microservice entity device being from at least one of the plurality of computing resource pools,
wherein the microservice deployment device is configured to:
obtain service processing information of the target service chain;
generate deployment update configuration information according to the service processing information of the target service chain; and
adjust a deployment position of each of the at least one target microservice entity device on the target service chain according to the deployment update configuration information;
wherein the service processing information comprises at least a service response time, and the service response time is determined based on load information of each of the at least one target microservice entity device on the target service chain and a transmission delay between target microservice entity devices,
wherein the deployment update configuration information comprises adjustment information for the deployment position of each of the at least one target microservice entity device on the target service chain, and
wherein the microservice deployment device is further configured to, based on a service response time of a target virtual service chain meeting a target service response time condition, generate the deployment update configuration information according to the deployment position of each of the at least one microservice entity device in the target virtual service chain, the target service response time condition being determined according to the service response time of the target service chain.

2. The system according to claim 1, wherein a computing resource pool of the plurality of computing resource pools comprises at least one of a central computing resource pool and an edge computing resource pool; the central computing resource pool is disposed in a central cloud environment, and the edge computing resource pool is disposed in an edge cloud environment;

wherein the microservice deployment device comprises a central decision-making module and a service deployment execution module, and both the central decision-making module and the service deployment execution module are disposed in the central cloud environment;

wherein the central decision-making module is configured to obtain the service processing information of the target service chain, and generate the deployment update configuration information according to the service processing information of the target service chain; and wherein the service deployment execution module is configured to adjust the deployment position of each of the at least one target microservice entity device on the target service chain according to the deployment update configuration information.

3. The system according to claim 2, wherein the central decision-making module is configured to:

construct a plurality of virtual service chains corresponding to the target service chain, each of the plurality of virtual service chains comprising at least one microservice entity device, the at least one microservice entity device being from at least one of the plurality of computing resource pools; and each of the plurality of virtual service chains having a virtual service response time;

select the target virtual service chain as having a shortest virtual service response time from the plurality of virtual service chains; and based on the service response time of the target virtual service chain meeting the target service response time condition, generate the deployment update configuration information according to the deployment position of each of the at least one microservice entity device in the target virtual service chain, the target service response time condition being determined according to the service response time of the target service chain.

4. The system according to claim 2, wherein the microservice deployment device further comprises a plurality of service load acquisition modules, and each of the plurality of computing resource pools is provided with a respective service load acquisition module from the plurality of service load acquisition modules;

wherein the respective service load acquisition module is configured to: acquire load information of each of at least one microservice entity device in the computing resource pool to which the respective service load acquisition module belongs, and report the acquired load information to the central decision-making module;

wherein the microservice deployment device further comprises a plurality of network quality monitoring modules, and each of the plurality of computing resource pools is provided with one of the plurality of network quality monitoring modules; and wherein a network quality monitoring module of the plurality of network quality monitoring modules is configured to: acquire a transmission delay between microservice entity devices in the computing resource pool to which the network quality monitoring module belongs, and report the acquired transmission delay to the central decision-making module.

5. The system according to claim 2, wherein the microservice deployment device further comprises a plurality of service request distribution modules; and a service request distribution module of the plurality of service request distribution modules is configured to: maintain a request forwarding table in the microservice management system, and update the request forwarding table according to the deployment update configuration information; and the request forwarding table is used for instructing a microservice entity device that processes a service request.

6. A microservice deployment method, performed by a microservice deployment device in a microservice management system, the microservice management system comprising a plurality of computing resource pools and a target service chain; the target service chain comprising at least one target microservice entity device, the at least one target microservice entity device being from at least one of the computing resource pools; and the method comprising:

obtaining service processing information of the target service chain, the service processing information comprising at least a service response time, the service response time being determined based on a load information of each of the at least one target microservice entity device on the target service chain and a transmission delay between target microservice entity devices;

generating deployment update configuration information according to the service processing information of the target service chain, the deployment update configuration information comprising adjustment information for a deployment position of each of the at least one target microservice entity device on the target service chain;

adjusting the deployment position of each of the at least one target microservice entity device on the target service chain according to the deployment update configuration information, and based on a service response time of a target virtual service chain meeting a target service response time condition, generate the deployment update configuration information according to the deployment position of each of the at least one microservice entity device in the target virtual service chain, the target service response time condition being determined according to the service response time of the target service chain.

7. The method according to claim 6, wherein the generating comprises:

constructing a plurality of virtual service chains corresponding to the target service chain, each of the plurality of virtual service chains comprising at least one microservice entity device, the at least one microservice entity device being from at least one of the plurality of computing resource pools; and each of the plurality of virtual service chains having a virtual service response time; and selecting the target virtual service chain as having a shortest virtual service response time from the plurality of virtual service chains.

8. The method according to claim 7, wherein the target service response time condition comprises: a difference between the service response time of the target service chain and the virtual service response time of the target virtual service chain is greater than a threshold.

9. The method according to claim 7, wherein the generating the deployment update configuration information according to the deployment position of each of the at least one microservice entity device in the target virtual service chain comprises:

for a microservice entity device configured to provide a same microservice, determining that the deployment position of the microservice entity device in the target virtual service chain is different from the deployment position of each of the at least one target microservice entity device on the target service chain; and generating deployment update configuration information according to the deployment position of the microservice entity device in the target virtual service chain.

10. The method according to claim 6, wherein a computing resource pool of the plurality of computing resource pools comprises at least one of a central computing resource pool and an edge computing resource pool; the central computing resource pool is disposed in a central cloud environment, and the edge computing resource pool is disposed in an edge cloud environment; and the adjusting the deployment position of each of the at least one target microservice entity device on the target service chain according to the deployment update configuration information comprises:

adjusting the deployment position of each of the at least one target microservice entity device on the target service chain in the central computing resource pool or the edge computing resource pool according to the deployment update configuration information.

11. The method according to claim 6, further comprising: updating a request forwarding table according to the deployment update configuration information, the request forwarding table being used for instructing a microservice entity device that processes a service request.

12. The method according to claim 11, wherein the request forwarding table comprises at least one forwarding table entry, and each forwarding table entry comprises: a service identifier, a target identifier, and a forwarding weight, the target identifier being used for indicating an IP address and a working port of a microservice entity device corresponding to the forwarding table entry, the forwarding weight being used for indicating a probability of forwarding a service request to the microservice entity device indicated by the target identifier; and the method further comprises:

based on a service request being received, forwarding, according to the forwarding weight in the request forwarding table, the service request to a microservice entity device that performs service processing in each computing resource pool.

13. The method according to claim 12, wherein each computing resource pool corresponds to one of the request forwarding table, and each request forwarding table comprises a forwarding table entry corresponding to a microservice entity device in a computing resource pool to which the request forwarding table belongs, and a forwarding table entry of a microservice entity device that has a call relationship with the microservice entity device in the computing resource pool to which the request forwarding table belongs.

14. The method according to claim 12, wherein the updating comprises:

adding, deleting, or modifying at least one of the forwarding table entries in the request forwarding table.

15. The method according to claim 10, wherein after the adjusting the deployment position of each of the at least one target microservice entity device on the target service chain in the central computing resource pool or the edge computing resource pool according to the deployment update configuration information, the method further comprises:

based on detecting that a deployment position of an initial microservice entity device that first processes a service request on the target service chain is being adjusted from the edge computing resource pool to the central computing resource pool, transmitting a request forwarding notification to a microservice deployment device deployed in the edge computing resource pool, the request forwarding notification being used for instructing the microservice deployment device deployed in the edge computing resource pool to forward the service request to a microservice deployment device deployed in the central computing resource pool.

16. The method according to claim 6, wherein the obtaining comprises:

obtaining load information of each of the at least one target microservice entity device on the target service chain, and a transmission delay and a call relationship between target microservice entity devices;

based on the load information of each of the at least one target microservice entity device, the transmission delay and the call relationship between target microservice entity devices, generating a directed acyclic graph (DAG) corresponding to the at least one target microservice entity device on the target service chain; and determining a service response time of the target service chain according to a DAG critical path algorithm and based on the DAG graph.

17. The method according to claim 7, wherein the constructing comprises:

detecting an initial deployment mode of the at least one target microservice entity device on the target service chain; and constructing a virtual service chain corresponding to the target service chain based on the initial deployment mode of the at least one target microservice entity device on the target service chain, a deployment mode of the at least one microservice entity device on the virtual service chain being different from the initial deployment mode of the at least one target microservice entity device on the target service chain.

18. The method according to claim 17, wherein the constructing the virtual service chain comprises:

listing all deployment modes of each of the at least one target microservice entity device on the target service chain in the plurality of computing resource pools by using an exhaustive method; and constructing, for the at least one target microservice entity device, a virtual service chain whose deployment mode is a target deployment mode, the target deployment mode being a deployment mode other than the initial deployment mode in all the deployment modes.

19. The method according to claim 6, wherein each of the at least one microservice entity device is configured to provide a service during service processing, the service comprises a game service or an Internet of Vehicles (IoV) service, and at least one microservice entity devices deployed in different types of computing resource pools are configured to provide different types of services.

20. A microservice deployment apparatus, configured in a microservice deployment device in a microservice management system, the microservice management system comprising a plurality of computing resource pools and a target service chain; the target service chain comprising at least one target microservice entity device, the at least one target microservice entity device being from at least one of the plurality of computing resource pools; and the deployment apparatus comprising at least one processor to implement:

an obtaining unit, configured to obtain service processing information of the target service chain, the service processing information comprising at least a service response time, the service response time being determined based on load information of each of the at least one target microservice entity device on the target service chain and a transmission delay between target microservice entity devices;

a processing unit, configured to generate deployment update configuration information according to the service processing information of the target service chain, the deployment update configuration information comprising adjustment information for a deployment position of each of the at least one target microservice entity device on the target service chain; and an adjustment unit, configured to adjust the deployment position of each of the at least one target microservice entity device on the target service chain according to the deployment update configuration information, and wherein the at least one processor is configured to implement, based on a service response time of a target virtual service chain meeting a target service response time condition, generating the deployment update configuration information according to the deployment position of each of the at least one microservice entity device in the target virtual service chain, the target service response time condition being determined according to the service response time of the target service chain.

* * * * *